(12) United States Patent
Michihata et al.

(10) Patent No.: US 7,790,249 B2
(45) Date of Patent: Sep. 7, 2010

(54) STRETCHED CELLULOSE ESTER FILM, POLARIZING PLATE AND LIQUID CRYSTAL DISPLAY EMPLOYING THE SAME

(75) Inventors: Isamu Michihata, Machida (JP); Kunio Shimizu, Otsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 384 days.

(21) Appl. No.: 11/204,405

(22) Filed: Aug. 16, 2005

(65) Prior Publication Data
US 2006/0045992 A1 Mar. 2, 2006

(30) Foreign Application Priority Data
Aug. 25, 2004 (JP) ............................. 2004-244772

(51) Int. Cl.
*G02F 1/13363* (2006.01)
(52) U.S. Cl. ..................... 428/1.33; 428/1.54; 349/117; 349/118; 349/96
(58) Field of Classification Search .................. 428/1.1, 428/1.33; 106/171.1, 168.01; 349/96
See application file for complete search history.

(56) References Cited
U.S. PATENT DOCUMENTS

| | | | | |
|---|---|---|---|---|
| 2,423,823 | A * | 7/1947 | Baker ........................... | 524/39 |
| 4,388,375 | A * | 6/1983 | Hopper et al. ............. | 428/423.7 |
| 5,609,677 | A * | 3/1997 | Itoh et al. ............... | 106/168.01 |
| 5,720,803 | A * | 2/1998 | Itoh et al. ............... | 106/168.01 |
| 6,015,871 | A * | 1/2000 | Jamasbi et al. ................ | 528/48 |
| 6,712,896 | B2 * | 3/2004 | Ono et al. ................. | 106/162.1 |
| 6,844,033 | B2 * | 1/2005 | Kobayashi et al. .......... | 428/1.33 |
| 6,946,519 | B2 * | 9/2005 | Okubo et al. .............. | 525/54.3 |
| 6,958,394 | B2 * | 10/2005 | Saito ........................... | 536/58 |
| 6,974,608 | B2 * | 12/2005 | Shimizu et al. ............ | 428/1.33 |
| 7,084,944 | B2 * | 8/2006 | Ito et al. ..................... | 349/117 |
| 7,105,212 | B2 * | 9/2006 | Ito .............................. | 428/1.3 |
| 7,125,591 | B2 * | 10/2006 | Nakajima et al. ........... | 428/1.33 |
| 7,226,499 | B2 * | 6/2007 | Matsufuji et al. ....... | 106/170.57 |
| 7,252,865 | B2 * | 8/2007 | Schunk et al. ................ | 428/1.3 |
| 7,354,633 | B2 * | 4/2008 | Saito et al. .................... | 428/1.3 |
| 2001/0026338 | A1 * | 10/2001 | Aminaka ..................... | 349/117 |
| 2002/0002252 | A1 * | 1/2002 | Obuchi et al. ................ | 525/450 |
| 2002/0156207 | A1 * | 10/2002 | Imuta et al. .................. | 526/127 |
| 2003/0037703 | A1 * | 2/2003 | Saito ..................... | 106/169.33 |
| 2003/0170482 | A1 * | 9/2003 | Murakami ................... | 428/615 |
| 2005/0112299 | A1 * | 5/2005 | Shimizu et al. ............. | 428/1.31 |
| 2006/0029750 | A1 * | 2/2006 | Shimizu et al. ............. | 428/1.31 |
| 2006/0115609 | A1 * | 6/2006 | Shimizu et al. .............. | 428/1.3 |
| 2006/0127607 | A1 * | 6/2006 | Okubo et al. ................ | 428/1.3 |
| 2006/0182901 | A1 * | 8/2006 | Takagi ........................ | 428/1.31 |
| 2006/0198991 | A1 * | 9/2006 | Takiyama et al. ........... | 428/172 |
| 2006/0216437 | A1 * | 9/2006 | Murakami ................... | 428/1.3 |
| 2006/0286395 | A1 * | 12/2006 | Goto et al. ................... | 428/480 |
| 2006/0292315 | A1 * | 12/2006 | Inagaki et al. .............. | 428/1.31 |
| 2007/0009676 | A1 * | 1/2007 | Tamagawa et al. .......... | 428/1.31 |
| 2007/0128381 | A1 * | 6/2007 | Yajima ........................ | 428/1.31 |
| 2007/0254115 | A1 * | 11/2007 | Murakami et al. .......... | 428/1.31 |

FOREIGN PATENT DOCUMENTS

| JP | 06148430 | | 5/1994 |
|---|---|---|---|
| JP | 2002120244 | | 4/2002 |
| JP | 2002267846 | | 9/2002 |
| JP | 2004175972 | | 6/2004 |
| JP | 2007084692 A | * | 4/2007 |

* cited by examiner

*Primary Examiner*—Rena L Dye
*Assistant Examiner*—Michele Jacobson
(74) *Attorney, Agent, or Firm*—Lucas & Mercanti, LLP

(57) ABSTRACT

A stretched cellulose ester film produced by stretching after film forming employing a cellulose ester including a polyester polyol obtained from (a) a glycol having an average carbon atom number of 2 to 3.5 and (b) a dibasic or an anhydrous dibasic acid having an average carbon number of 4 to 5.5, wherein the stretched cellulose ester film exhibits retardation value Ro in the range of 30 to 200 nm, and a retardation value Rt in the range of 70 to 400 nm, Ro and Rt are each defined by specific Formulas (1) and (2).

9 Claims, No Drawings

STRETCHED CELLULOSE ESTER FILM, POLARIZING PLATE AND LIQUID CRYSTAL DISPLAY EMPLOYING THE SAME

THIS APPLICATION IS BASED ON JAPANESE PATENT APPLICATION NO. 2004-244772 FILED ON AUG. 25, 2004, IN JAPANESE PATENT OFFICE, THE ENTIRE CONTENT OF WHICH IS HEREBY INCORPORATED BY REFERENCE.

FIELD OF THE INVENTION

This invention relates to a stretched cellulose ester film, a polarizing plate using the stretched cellulose ester film, and a liquid crystal display.

BACKGROUND OF THE INVENTION

Much attention is being given to the use of liquid crystal display devices in large screen televisions. When compared with existing notebook personal computers and liquid crystal monitors, the performance required of large liquid crystal display televisions is becoming increasingly exacting in terms of stability with respect to changes in angle of vision, contrast and the environment in which the device is used. Accordingly, the polarizing plate used in the liquid crystal display device, and the cellulose ester film used in the polarizing plate are subjected to the same exacting requirements in terms of performance, and because the stretched cellulose ester film greatly affects optical performance, this is an important member and there are strict requirements in terms of the specifications.

One property which has been subjected to exacting requirements due to use in large screen televisions is humidity stability of optical properties, and because existing cellulose ester films are highly hygroscopic, there has been a problem in that humidity stability is poor.

The inventors discovered that by including specific polyesters in the cellulose ester, the humidity stability of the optical properties was improved. Up until the present time, there have been a number of proposals with respect to including polyester in the cellulose ester (see Patent Documents 1-4 for example). However, the proposal that have been made up until now, do not suggest improvement of humidity stability of the optical properties to begin with, and furthermore, in almost all of these proposals, when an amount of 10% or less is included, cloudiness and bleeding out occurs and thus improvement was desired urgently.

[Patent Document 1] Unexamined Japanese Patent Application Publication No. (referred to as JP-A) 2002-22956

[Patent Document 2] JP-A 2002-267846

[Patent Document 3] JP-A 2004-175971

[Patent Document 4] JP-A 2004-175972

SUMMARY OF THE INVENTION

Due to the aforementioned situation, the object of this invention is to provide a stretched cellulose ester film in which the humidity stability of the optical properties is improved and a polarizing plate and liquid crystal display device which uses this stretched cellulose ester film.

DETAILED DESCRIPTION OF THE INVENTION

The present invention achieves the above-described objects using the following configurations.

(Item 1)

A stretched cellulose ester film produced by stretching after film forming employing a cellulose ester including a polyester polyol obtained from (a) a glycol having an average carbon atom number of 2 to 3.5 and (b) a dibasic or an anhydrous dibasic acid having an average carbon number of 4 to 5.5, wherein the stretched cellulose ester film exhibits retardation value Ro in the range of 30 to 200 nm, and a retardation value Rt in the range of 70 to 400 nm, Ro and Rt are each defined by Formulas (1) and (2):

$$Ro=(nx-ny) \times d, \text{ and} \qquad \text{Formula (1)}$$

$$Rt=\{(nx+ny)/2-nz\} \times d, \qquad \text{Formula (2)}$$

wherein nx is a refractive index in an x direction which gives a maximum refractive index in a plane of the film, ny is a refractive index in a y direction which is orthogonal to the x direction in the plane of the film, nz is a refractive index in a thickness direction of the film, and d is a thickness (nm) of the film.

(Item 2)

The stretched cellulose ester film of Item 1, wherein the total acyl substitution degree of the cellulose ester is between 2.4 and 2.8.

(Item 3)

The stretched cellulose ester film of Item 1 or 2, wherein (a) the glycol is ethylene glycol or a mixture of ethylene glycol and diethylene glycol, and (b) the dibasic acid or anhydrous dibasic acid is succinic acid or a mixture of succinic acid and terephthalic acid.

(Item 4)

The stretched cellulose ester film of any one of Items 1-3, wherein the cellulose ester film comprises an additive having a number average molecular weight of 500 or less and a polyester polyol having a number average molecular weight of 1,000 or more, and the proportion of the weight of the additive to the weight of the polyester polyol is equal to 0.1 or less.

(Item 5)

The stretched cellulose ester film of any one of Items 1-4, containing 10 to 30 percent by weight of the polyester polyol having the number average molecular weight of 1,000 or more.

(Item 6)

The stretched cellulose ester film of any one of Items 1-5, wherein the cellulose ester film contains an ultraviolet light absorbing copolymer synthesized from an ultraviolet light absorbing monomer represented by Formula (1):

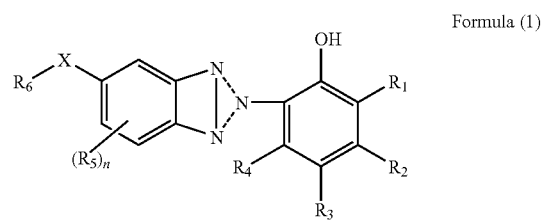

Formula (1)

wherein n is an integer of 0 to 3, $R_1$ to $R_5$ are each a hydrogen atom, a halogen atom or a substituent group, X is —COO—, —CONR$_7$—, —OCO—, or NR$_7$CO, and $R_6$ is a hydrogen atom, an alkyl group, an alkenyl group, an alkinyl group or an aryl group, $R_7$ is a hydrogen atom, an alkyl group, or an aryl group, and the group represented by $R_6$ has a polymerizable group as a part of its structure.

(Item 7)

A polarizing plate comprising the stretched cellulose ester film of Items 1-6.

(Item 8)

A liquid crystal display device comprising the stretched cellulose ester film of Items 1-6.

(Item 9)

A liquid crystal display device comprising the polarizing plate of Item 7.

EFFECTS OF THE INVENTION

This invention provides a stretched cellulose ester film in which humidity stability of the optical properties is improved, and a polarizing plate and crystal display device which use this stretchable cellulose film.

PREFERRED EMBODIMENTS OF THIS INVENTION

It should be understood that no single element of any of the embodiments described herein is essential, and that it is within the contemplation of the invention that one or more elements of one or more embodiments of the invention as described herein may be omitted or their functionality may be combined with that of other elements as a general matter of design choice.

Preferred embodiments of this invention are described in detail in the following, but this invention is not to be limited by these embodiments.

As a result of diligent studies, we discovered that the polyester polyol obtained from the glycol (a) in which the average number of carbon atoms is 2-3.5 and the (anhydrous) dibasic acid (b) in which the average number of carbon atoms is 4-5.5 can be included in the cellulose ester without cloudiness or bleeding out, and in addition, we discovered that humidity stability of the optical properties were improved.

We also discovered that when a large amount of the polyester polyol is included, a problem arises in that the retardation values Ro and Rt are not easily exhibited, and in response to this we identified that exhibition of the retardation values Ro and Rt is improved if the total acyl substitution degree of the cellulose ester is between 2.4 and 2.8.

This invention is a cellulose ester film which is formed by using a cellulose ester including polyester polyol obtained from the glycol (a) and the (anhydrous) dibasic acid (b), and the method for producing this film may any of the or the melt casting method or the solution casting method and the like.

This invention will be described in detail in the following.

First, the cellulose ester used in this invention will be described.

The cellulose ester used in the cellulose ester film of this invention is obtained by using cellulose selected from linter pulp, wood pulp and kenaf pulp, and reacting the cellulose with acetic anhydride, propionic anhydride, or sulfuric acid anhydride using conventional methods. Cellulose triacetate, cellulose acetate propionate, cellulose acetate butyrate, and cellulose acetate propionate butyrate which have a total degree of acyl group substitution for the hydroxyl group in the range between 2.4 and 2.8 is preferably used. If the total degree of acyl group substitution is less than 2.4, the exhibition of the retardation values Ro and Rt is favorable, but from the viewpoint of water vapor permeability, humidity stability deteriorates, and because the angle of contact at the time of the alkali saponification treatment becomes low, adhesion properties of the polarizer deteriorates. If the total degree of acyl group substitution exceeds 2.8, the exhibition of the retardation values Ro and Rt is particularly poor when polyester polyol is included. In order to exhibit retardation values within the range of this invention, it is preferable that the degree of total acyl group substitution is between 2.4 and 2.8.

In this invention, the cellulose triacetate (sometimes referred to as TAC hereinafter) and the cellulose acetate propionate (sometimes referred to as CAP hereinafter) are preferable. Cellulose acetate propionate is particularly preferable. The method for measuring the degree of acyl group substitution for the cellulose ester may be carried out using ASTM D-817-91. The number average molecular weight of the cellulose ester is preferably in a range between 70,0000 and 300,000 in view of the fact that the mechanical strength when the film is formed is high. A range of 80,000-200,000 is more preferable. Normally, the cellulose ester is in a flake-like form after the water washing treatment performed after the reaction, and the cellulose ester may be used in this flake-like form, but it is preferable that the particle size is such that the particle diameter is in the range of 0.05-2.0 mm since dissolution is quicker.

A solution in which cellulose ester is dissolved in an organic solvent is called dope, and the concentration of cellulose ester in the dope is 10-35 percent by weight, and more preferably 15-25 percent by weight.

Examples of good solvents of the cellulose ester include organic solvents such as, methyl acetate, ethyl acetate, amyl acetate, ethyl formate, acetone, cyclohexanone, methyl acetoacetata, tetrahydrofuran, 1,3-dioxolane, 4-methyl 1,3-dioxolane 1,4-dioxane, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride, and bromopropane. Of these, methyl acetate, acetone and methyl chloride are preferably used. However, there is a tendency for non-chlorine organic solvents to be more preferable based on recent environmental problems. Low grade alcohols such as methanol, ethanol, butanol and the like can be favorably used along with these organic solvents, since they can improve the solubility of the cellulose ester in the organic solvent and reduce the viscosity of the dope. Ethanol in particular is favorable because of its low boiling point and it low toxicity. It is preferable that organic solvent used with the dope of this invention is a mixture of a good solvent and a poor solvent for cellulose ester in view of production efficiency, and a favorable range of proportion for mixing the good solvent and the poor solvent is 70-98 percent by weight of the good solvent and 30-2 percent of the poor solvent. A good solvent in this invention is defined as a solvent that will dissolve the cellulose ester that is used on its own while a poor solvent is one that does not dissolve the cellulose ester on its own. The poor solvent used with the dope of this invention is not particularly limited, but examples of the solvent that is preferably used include methanol, ethanol, n-butanol, cyclohexane, acetone, cyclohexanone and the like.

The cellulose ester film of this invention is preferably a protective film for a polarizing plate, but a property of this type of film is that because the cellulose ester film includes a polymer that is mainly polyester, substances that will deposit, volatilize and evaporate from the film can be removed, and after the plate is formed, there is no cloudiness or bleeding out, and furthermore humidity stability is improved.

The polymer selected for use in this invention is one which does not cause phase separation in the cellulose ester dope or the cellulose ester film.

The results of the studies done by the inventors revealed that in the case where the ratio of the weight of the additive whose number average molecular weight is 500 or less and the weight of the polyester polyol relating to this invention whose number average molecular weight is 1,000 or more is 0.1 or less, the compatibility with the cellulose ester is improved. The polymer used in this invention does not separate into phases, become cloudy or bleed out even when exposed to poor conditions such as high temperature and high humidity and the like in the step where it is added to the cellulose ester dope, or during step up until when it is cast and the film is formed, or during the time the time that elapses until the finished cellulose ester film is formed. Also, change in dimension subsequent to the formation of the film is extremely small and storage stability is excellent. An additive having a number average molecular weight is 500 or less refers to a plasticizer, a ultraviolet light absorber, a retardation regulator, a stabilizer or an antioxidant and the like having a number average molecular weight in this range.

It is to be noted that the number average molecular weight can be measured by a usual method using GPC (Gel Permeation Chromatography). For example, the measurement may be carried out using a column (manufactured by Showa Electronics Company, SHODEX-K806-K803) at a temperature of 25° C. using methyl chloride as the eluent, with a flow rate of 1.0 ml/min and detection $R_1$ with an amount of 100 μl and a sample concentration of 0.1 (weight/capacity %). In addition polyethylene styrene is used as the reference sample.

The polyester polyol used in this invention will be described in the following.

The polyester polyol used in this invention is produced using a conventional method by a dehydration reaction of a glycol (a) in which the average number of carbon atoms is 2-3.5 and a dibasic acid (b) in which the average number of carbon atoms is 4-5.5, or by an addition and dehydration reaction of the glycol (a) and the anhydrous dibasic acid (b) in which the average number of carbon atoms is 4-5.5

Examples of the glycol (a) used in the polyester polyol include ethylene glycol, diethylene glycol, 1,2-propylene glycol, 1,3-propylene glycol, 2-methyl-1,3-propanediol, 1,4-butyl glycol, neopentyl glycol, 3-methyl-1,5-pentanediol, 1,6-hexane diol, and these may be used singly or in combinations of 2 or more. For example, it is particularly favorable for ethylene glycol or a mixture of ethylene glycol and diethylene glycol to be used.

In addition, with respect to the glycol (a), it is important the average number of carbon atom in the glycol (a) be in the range of 2-3.5. If the average number of carbon atoms in the glycol (a) is less than 2, production of the polyester polyol becomes difficult, while if it is more than 3.5, the cellulose ester modifier has decreased compatibility with cellulose and the cellulose film has compromised physical properties such as transparency. The average number of carbon atom in the glycol (a) is preferably in the range of 2.1-2.8 or in the range of 3.2-3.5, and by using a glycol (a) whose average number of carbon atoms is in these ranges, the crystal properties and the melting point of the polyester polyol are close to that of those generally used in the past, and the production properties of the polyester polyol itself is improved.

In the case where a mixture of ethylene glycol and diethylene glycol is used as the glycol (a), the mole ratio used for the ethylene glycol/diethylene glycol is preferably 25-100/75-0, and this allows a cellulose ester modifier having excellent compatibility with the cellulose ester to be obtained. Furthermore, more preferable ranges are 25-40/75-60 and 60-95/40-5. By preparing the mixture such that the proportions are in the foregoing ranges, the crystal properties and the melting point of the polyester polyol are close to that of those generally used in the past, and the production properties of the polyester polyol itself is improved.

Examples of the dibasic acid (b) comprising the polyester polyol include succinic acid, glutaric acid, adipidic acid, sepacinic acid and the like and these may be used singly or in combinations of 2 or more. For example, succinic acid or a mixture of succinc acid and terepthalic acid may be used.

In addition, with respect to the dibasic acid (b), it is important that the average number of carbon atoms in the dibasic acid (b) is in the range of 4-5.5. If the average number of carbon atoms in the dibasic acid (b) is less than 4, production of the polyester polyol becomes difficult, while if it is more than 5.5, the cellulose ester modifier has decreased compatibility with cellulose and the cellulose film has compromised physical properties such as transparency. The average number of carbon atom in the dibasic acid (b) is preferably in the range of 4.1-4.8 or in the range of 5.2-5.5, and by using a dibasic acid (b) whose average number of carbon atoms is the foregoing ranges, the crystal properties and the melting point of the polyester polyol are close to that of those generally used in the past, and the production properties of the polyester polyol itself is improved.

In the case where a mixture of succinic acid and terepthalic acid is used as the dibasic acid (b), the mole ratio used for the succinic acid/terepthalic acid is preferably 25-100/75-0, and this allows a cellulose ester modifier having excellent compatibility with the cellulose ester to be obtained. Furthermore, more preferable ranges are 25-40/75-60 and 60-95/40-5. By preparing the mixture such that the proportions are in this range, the crystal properties and the melting point of the polyester polyol are close to that of those generally used in the past, and the production properties of the polyester polyol itself is improved.

The glycol (a) and the dibasic acid (b) comprising the polyester polyol used in this invention may be used in combinations other than those described above, but combinations in which the total of the average number of carbon atoms in the glycol (a) and the average number of carbon atoms in the dibasic acid (b) is in the range of 6-7.5 are preferable.

The polyester polyol obtained from the glycol (a) and the dibasic acid (b) basically uses a hydroxide group terminal polyester having a number average molecular weight of 1,000-200,000 and more preferably of 1,000-5,000, and those having a number average molecular weight of 1,200-4000 is particularly preferable. By using a polyester polyol whose number average molecular weight is the foregoing range, a cellulose ester modifier having excellent compatibility with the cellulose ester can be obtained by a fixed phase reaction.

In order to obtain the effects of this invention, it is preferable that the amount of the polyester polyol having a number average molecular weight of 1,000 or more that is included in the film is 10-30 percent by weight and 10-20 percent by weight is more preferable. If the number average molecular weight is larger than the foregoing range, compatibility decreases and this clouds the effect of decreasing the water vapor permeability, and meanwhile there is a tendency for the storage stability to decrease. Thus number average molecular weight in the above-described range is preferable. The amount of polymer actually included in the film is determined in accordance with properties such as dimensional stability, storage stability and transparency, depending on the type of the polymer and the weight average molecular weight thereof. The determination is a range such that there is no phase separation after film formation in the dope and the web.

Meanwhile, the carboxyl group terminal in the polyester polyol used in this invention reduces the effect of improving the physical properties of the cellulose ester modifier of this invention, and thus the amount included is preferably kept below 1/20, and more preferably below 1/40 of the number of mole of the hydroxide group terminal.

In order to produce the polyester polyol described above, known, esterification catalysts such as metallic organic acid salts such as those of titanium, zinc, lead, zirconium and the like or metal chelate compounds, or antimony oxide may be used. Examples of the esterification catalyst which are favorably used include tetraisopropyl titanate, tetrabutyl titanate and the amount used is preferably 0.0005-0.02 parts by weight for the total of 100 parts by weight of the glycol (a) and dibasic acid (b) that are used.

Polycondensation of the polyester polyol is carried out using a conventional method. Examples methods by which the synthesis can be easily carried out include direct reaction of the dibasic acid and the glycol; thermal melting condensation due to a polyesterification reaction or ester exchange reaction of the above dibasic acid or an alkyl ester thereof such as dibasic methyl ester, with a glycol; a dehydrohalogenation reaction of an acid chloride of these acid and a glycol. However, it is preferable that direct reaction is used for polyester polyols whose number average molecular weight is not particularly high. Polyester polyols whose distribution is high at the low molecular weight side are extremely compatible with the cellulose ester and after film formation, a cellulose ester film can be obtained in which water vapor permeability is low and which is also very transparent. The method for adjusting the molecular weight is not particularly limited and any method known heretofore may be used. For example, although this also depends on the polymerization conditions, by using a method of ending the molecule terminal with a monovalent acid or a monovalent alcohol, control can be achieved by the amount of these monovalent substances added. In this case, the monovalent acid is preferable in view of the stability of the polymer. Examples include acetic acid, propionic acid, butric acid, pivalic acid, benzoic acid and the like, but a monovalent acid in which distillation is easily performed when the polycondensation reaction is stopped and the monovalent acid is removed externally without external distillation during the polycondensation reaction is selected, and these monovalent acids may be mixed and used. In addition, in the case of the direct reaction, adjustment of the number average molecular weight can also be done by gauging the timing for stopping of the reaction due to the water which is distilled during the reaction. In addition, the adjustment can be done by biasing the number of moles of the glycol or dibasic acid that is introduced, or by controlling the reaction temperature.

The polarizing plate protective film and other films used in the liquid crystal image display device include an ultraviolet light absorber, and the ultraviolet light absorber has the role of preventing deterioration of the liquid crystals or the polarizing film when the device is used outdoors. The ultraviolet light absorber is preferably used in this invention also. The ultraviolet light absorbers exhibit excellent absorption for ultraviolet radiation having a wavelength of no longer than 370 nm and exhibit minimal absorption for visible light having a wavelength of no shorter than 400 nm. The transmissivity at 370 nm in particular must be no greater than 10%, and more preferably no greater than 5% and still more preferably, no greater than 2%. Examples of the ultraviolet light absorber used in this invention include oxybenzophenone based compounds, benzotriazole based compounds, salicylic acid ester based compounds, benzophenone based compounds, cyano acrylate based compounds, nickel complex based compounds, and the like. Of these, benzotriazole compounds which result in less coloration are preferred. The benzotriazole based ultraviolet light absorbers and the benzophenone based ultraviolet light absorbers which exhibit stability in light are preferable, and benzotriazole based ultraviolet light absorbers which result in little coloration which is not required is particularly preferred. Examples include TINUVIN 109 (called UV-1), TINUVIN 171, TINUVIN 326, TINUVIN 327, and TINUVIN 328 which are manufactured by Chiba Specialty Chemical Co., Ltd. The amount of ultraviolet light absorbers which have low molecular weight that is used is between 3 and 10 percent by weight because there is the possibility that there will be web deposition or volatilizing during formation of the film due to the amount of the ultraviolet light absorber, as is the case with the plasticizer.

In this invention, the high molecular weight ultraviolet light absorber in which deposition and the like due to the above-described low molecular weight light absorber is unlikely to occur, is preferably included in the polymer as well as the cellulose ester film of this invention. As a result, the ultraviolet light can cut adequately in a stable state without losing dimensional stability, storage stability, water vapor permeability and the like, and without phase separation in the film. Those high molecular weight ultraviolet light absorber polymers described in Japanese Patent Application Laid-Open No. 6-148430 publication and the polymers including ultraviolet light absorber monomers may be used without limit as the high molecular weight ultraviolet light absorber polymer used in this invention.

In this invention, it is particularly preferable that the ultraviolet light absorber copolymer (high molecular weight ultraviolet light absorber) synthesized from the ultraviolet light absorber monomer shown in Formula (1) is included.

In the Formula (1), n represents an integer from 0 to 3, and when n is 2 or more, the plurality of $R_5$ may be the same or different, and may be linked to each other to form a chain with 5-7 members.

$R_1$ to $R_5$ each represents a hydrogen atom, a halogen atom or a substituent group. Examples of the halogen atom include a fluorine atom, a chlorine atom, a bromine atom, and an iodine atom, and the fluorine atom and the chlorine atom are preferable. In addition, examples of the substituent group includes an alkyl group (such as a methyl group, an ethyl group, an isopropyl group, a hydroxyethyl group, a methoxymethyl group, a trifluoromethyl group, a t-butyl group and the like), an alkenyl group (such as a vinyl group, an aryl group, a 3-butene-1-yl group and the like), an aryl group (such as a phenyl group, a naphtyl group, a p-triyl group, a p-chlorophenyl group and the like), a hetero-cyclic group (such as a pyridyl group, a benzimidazole group, a benzthiazole group, a benzoxazolyl group and the like), an alkoxy group (such as a methoxy group, an isopropoxy group, an n-butoxy group and the like), aryloxy group (such as a phenoxy group and the like), a hetero-cyclic oxy group (such as 1-phenyltetrazole-5-oxy group, 2-tetrahydropyranyloxy group and the like), an acyloxy group (such as an acetoxy group, pivaroyloxy group, a benzoyloxy group and the like), an acyl group (such as an acetyl group, a propanoyl group, a butyroyl group), an alkoxycarbonyl group (such as a methoxycarbonyl group, an ethoxycarbonyl group and the like), an aryloxy carbonyl group (such as a phenoxy carbonyl group and the like), a carbamoyl group (such as a methyl carbamoyl group, an ethyl carbamoyl, a dimethyl carbamoyl group), an amino group, an alkyl amino group (such as a methyl amino group, an ethyl amino group, a diethyl amino group and the like), anilino group (such as N-methyl anilino and the like), an acyl amino group (such as an acetyl amino group, a propionyl amino group, and the like) a hydroxyl group, a cyano group, a nitro group, a sulfonamide group (such a methane sulfonamide group, a benzene sulfonamide group and the like), a sulfamoyl amino group (such as a dimethyl sulfamoyl amino group and the like), a sulfonyl group (such as a methane sulfonyl group, a butane sulfonyl group, a phenyl sulfonyl group and the like), a sulfamoyl group (such as ethyl sulfamoyl group, dimethyl sulfamoyl group and the like), a sulfonyl amino group (such as a methane sulfonyl amino group, a benzene sulfonyl amino group and the like), a ureido group (such as a 3-methyl ureido group, a 3,3-dimethyl ureido group, a 1,3 dimethyl ureido group and the like), an imide group (such as a phthalimide group and the like), a silyl group (such as trimethyl silyl, triethyl silyl, t-butyldimethyl silyl group and the like), an alkylthio group (such as a methyl thio group, an ethyl thio group, an n-butyl thio group and the like), an arylthio group (such as phenylthio group and the like), and of these the alkyl group and aryl group are preferable.

In the Formula (1), in the case where the groups represented by $R_1$ to $R_5$ may be further substituted, they may have additional substituent groups, and adjacent $R_1$ to $R_4$ may link with each other to form rings having 5-7 members.

$R_6$ represents a hydrogen atom, an alkyl group, a cycloalkyl group, an alkenyl group, an alkinyl group, an aryl group, or a heterocyclic group, and examples of the alkyl group include a methyl group, an ethyl group, a propyl group, an isopropyl group, a n-butyl group, an isobutyl group, a t-butyl group, an amyl group, an isoamyl group, a hexyl group and the like. In addition, the foregoing alkyl groups may further have a halogen atom or a substituent group. Examples of the halogen atom include fluorine atom, a chlorine atom, a bromine atom, an iodine atom and the like. Examples of the substituent group include an aryl group (such as a phenyl group, a napthyl group, a p-tolyl group, a p-chlorophenyl group and the like, an acyl group (such as an acetyl group, a propanoyl group, a butyroyl group and the like), an alkoxy group (such as a methoxy group, an ethoxy group, an isopropoxy group, an n-butoxy group and the like), and aryloxy group (such as a phenoxy group and the like), an amino group, an alkyl amino group (such as a methyl amino group, an ethyl amino group, a diethyl amino group), an anilino group (such N-methyl anilino and the like), an acyl amino group (such as an acetyl amino group, a propionyl amino group and the like), a hydroxyl group, a cyano group, a carbamoyl group (such as a methyl carbamoyl group, an ethyl carbamoyl, a dimethyl carbamoyl group and the like), an acyloxy group (such as an acetoxy group, pivaroyloxy group, a benzoyloxy group and the like), alkoxycarbonyl group (such as a metoxycarbonyl group, an etoxycarbonyl group and the like), and an aryloxy carbonyl group (such as a phenoxy carbonyl group and the like).

Examples of the cycloalkyl group include saturated ring hydrocarbons such as a cyclopentyl group, a cyclohexyl group, a norbonyl group, an adamantyl group and the like and these may be substituted or unsubstituted.

Examples of the alkenyl group include a vinyl group, an aryl group, a 1-methyl-2-propenyl group, a 3-butenyl group, a 2-butenyl group, a 3-methyl-2-butenyl group, an oleyl group and the like. Of these the vinyl group and the 1-methyl-2 propenyl group are preferable.

Examples of the alkinyl group include an ethynyl group, a butadyl group, a phenyl ethynyl group, a propalgyl group, a 1-methyl-2-propinyl group, a 2-butinyl group, a 1,1-dimethyl-2-propinyl group and the like, and of these the ethynyl group and the propalgyl group are preferable.

Examples of the aryl group include a phenyl group, a naphthyl group, an antranyl group and the like, but the foregoing aryl group may include a halogen atom and a substituent group. Examples of the halogen atom include a fluorine atom, a chlorine atom, a bromine atom, and an iodine atom and the like. Examples of the substituent group includes an alkyl group (such as a methyl group, an ethyl group, an isopropyl group, a hydroxyethyl group, a methoxymethyl group, a trifluoromethyl group, a t-butyl group and the like), an acyl group (such as an acetyl group, a propanoyl group, a butyroyl group), an alkoxy group (such as a methoxy group, an ethoxy group, an isopropoxy group, an n-butoxy group and the like), and aryloxy group (such as a phenoxy group and the like), an amino group, an alkyl amino group (such as a methyl amino group, an ethyl amino group, a diethyl amino group and the like), an anilino group (such as an N-methyl aniline group and the like), an acyl amino group (such as an acetyl amino group, a propionyl amino group and the like), a hydroxyl group, a cyano group, a carbamoyl group (such as a methyl carbamoyl group, an ethyl carbamoyl, a dimethyl carbamoyl group and the like), an acyloxy group (such as an acetoxy group, pivaroyloxy group, a benzoyloxy group and the like), alkoxycarbonyl group (such as a methoxycarbonyl group, an ethoxycarbonyl group and the like), an aryloxy carbonyl group (such as a phenoxy carbonyl group and the like).

Examples of the heterocyclic group include a pyridyl group, a benzimidazole group, a benzthiazole group, a benzoxazole group and the like. Of these $R_6$ is preferably an alkyl group.

In the Formula (1), X represents —COO—, —CONR$_7$, —OCO—, or NR$_7$CO—.

$R_7$ represents a hydrogen atom, an alkyl group, a cycloalkyl group, an aryl group, or a heterocyclic group, and examples of the alkyl group include a methyl group, an ethyl group, a propyl group, an isopropyl group, an n-butyl group, an isobutyl group, a t-butyl group, an amyl group, an isoamyl group, a hexyl group and the like. The alkyl group may have a halogen atom or a substituent group. Examples of the halogen atom include a fluorine atom, a chlorine atom, a bromine atom, and an iodine atom and the like. Examples of the substituent group include an aryl group (such as a phenyl group a napthyl group, a p-tolyl group, a p-chlorophenyl group, and the like), an acyl group (such as an acetyl group, a propanoyl group, a butyroyl group and the like), an alkoxy group (such as a methoxy group, an ethoxy group, an isopropoxy group, an n-butoxy group and the like), and aryloxy group (such as a phenoxy group and the like), an amino group, an alkyl amino group (such as a methyl amino group, an ethyl amino group, a diethyl amino group and the like), an anilino group (such as N-methyl aniline and the like), an acyl amino group (such as an acetyl amino group, a propionyl amino group), a hydroxyl group, a cyano group, a carbamoyl group (such as a methyl carbamoyl group, an ethyl carbamoyl group, a dimethyl carbamoyl group and the like), an acyloxy group (such as an acetoxy group, pivaroyloxy group, a benzoyloxy group and the like), an alkoxy carbonyl group (such as a methoxy carbonyl group, an ethoxy carbonyl group and the like), and an aryloxy carbonyl group (such as a phenoxy carbonyl group and the like).

Examples of the cycloalkyl group include saturated ring hydrocarbons such as a cyclopentyl group, a cyclohexyl group, a norbonyl group, an adamantyl group and the like and these may be substituted or unsubstituted.

Examples of the aryl group include a phenyl group, a naphthyl group, an antranyl group and the like, but the aryl group may further include a halogen atom and a substituent group. Examples of the halogen atom include a fluorine atom, a chlorine atom, a bromine atom, and an iodine atom and the like. Examples of the substituent group includes an alkyl group (such as a methyl group, an ethyl group, an isopropyl group, a hydroxyethyl group, a methoxymethyl group, a trifluoromethyl group, a t-butyl group and the like), an acyl group (such as an acetyl group, a propanoyl group, a butyroyl group), an alkoxy group (such as a methoxy group, an ethoxy group, an isopropoxy group, an n-butoxy group and the like), and aryloxy group (such as a phenoxy group and the like), an amino group, an alkyl amino group (such as a methyl amino group, an ethyl amino group, a diethyl amino group and the like), an anilino group (such as an N-methyl anilino group and the like), an acyl amino group (such as an acetyl amino group, a propionyl amino group and the like), a hydroxyl group, a cyano group, a carbamoyl group (such as a methyl carbamoyl group, an ethyl carbamoyl, a dimethyl carbamoyl group and the like), an acyloxy group (such as an acetoxy group, pivaroyloxy group, a benzoyloxy group and the like), alkoxycarbonyl group (such as a methoxycarbonyl group, an ethoxycarbonyl group and the like), and an aryloxy carbonyl group (such as a phenoxy carbonyl group and the like).

Examples of the heterocyclic group include a pyridyl group, a benzimidazole group, a benzthiazole group, a benzoxazole group and the like. $R_7$ is preferably a hydrogen atom group.

The polymerizable group of this invention refers to an unsaturated ethylene based polymerizable group or a polycondensation group with two functional groups, but is preferably an unsaturated ethylene based polymerizable group. Specific examples of the unsaturated ethylene based polymerizable group include a vinyl group, an aryl group, an acryloyl group, a metacryloyl group, a styryl group, an acrylamide group, a metacryalmide group, a vinyl cyanide group, a 2-cyanoacryl oxy group, 1,2-epoxy group, a vinyl benzyl group, a vinyl ether group, and the like. Of these, the vinyl group, the acryloyl group, the metacryloyl group, the acrylamide group, and the metacrylamide group are preferable. Furthermore including a polymerizable group as a structural part refers to the polymerizable group being linked directly or by a bonding group with a valency of 2 or higher. Examples of the bonding group with a valency of 2 or higher include an alkylene group (such as methylene, 1,2-ethylene, 1,3-propylene, 1-4 butylene, cyclohexane-1,4-diyl and the like), an alkenylene group (such as ethylene-1,2-diyl, butadiene-1,4-diyl and the like), an alkinylene group (such as ethene 1,2-diyl, butadiene-1,3-diyl-1,4-diyl and the like) and a bonding group derived from a compound including at least one aromatic group (such as substituted or unsubstituted benzene, condensed polycyclic carbon, an aromatic heterocyclic ring, an aromatic hydrocarbon ring aggregate, an aromatic heterocyclic aggregate and the like), a hetero atom bonding group (such as an oxygen, sulfur, nitrogen, silicon, or phosphorous atom and the like), and of these a preferable example is a group in which the alkylene group and the heteroatom are bonded. The bonding groups may be further combined to form a heterocyclic group. The weight average molecular weight of the polymer derived from the ultraviolet light absorbing monomer is preferably in the range between 2,000 and 30,000 and more preferably in the range between 5,000 and 20,000.

The weight average molecular weight of the ultraviolet light absorbing polymer can be prepared by a known molecular weight preparation method. Examples of the preparation method include a method using a chain transfer agent such as carbon tetrachloride, lauryl metacarptan, octyl thioglycolate and the like. The polymerization temperature may be between room temperature and 130° C., and more preferably between 50° C. and 100° C.

The ultraviolet light absorbing polymer used in this invention may be a homopolymer of a monomer, or a copolymer with another polymerizable monomer. Examples of the other polymerizable monomer which can form a copolymer include unsaturated compounds such as a styrene derivative (such as styrene, α-methyl styrene, o-methyl styrene, m-methyl styrene, p-methyl styrene, vinyl naphthalene and the like), ester acrylic derivatives (such as methyl acrylate, ethyl acrylate, propyl acrylate, butyl acrylate, i-butyl acrylate, t-butyl acrylate, octyl acrylate, cyclohexyl acrylate, benzyl acrylate and the like), methacrylic acid ester derivatives (such as methyl methacrylate, ethyl methacrylate, propyl methacrylate, butyl methacrylate, i-butyl methacrylate, t-butyl methacrylate, octyl methacrylate, cyclohexyl methacrylate, benzyl methacrylate and the like), alkyl vinyl ethers (such as methyl vinyl ether, ethyl vinyl ether, butyl vinyl ether, and the like), alkyl vinyl esters (such as vinyl formate, vinyl acetate, vinyl butylate, vinyl caproate, vinyl stearinate and the like), crotonic acid, maleinic acid, fumaric acid, itaconic acid, acrylonitrile, metacrylonitrile, vinyl chloride, vinyledene chloride, acryl amide, metacryl amide. Of these, methyl acrylate, methyl metacrylate, and vinyl acetate are preferable.

The copolymer component other than the ultraviolet light absorbing monomer in the polymer derived from the ultraviolet light absorbing monomer preferably includes at least one hydrophilic ethylene-based unsaturated monomer.

The hydrophilic ethylene-based unsaturated monomer is not particularly limited provided that it is hydrophilic and that there is a polymerizable unsaturated double bond in the molecule such as the unsaturated carbonic acids of acrylic acid or methacrylic acid, or acrylic or methacrylic esters which have a hydroxyl group or an ether bond (such as 2-hydroxyethyl metacrylate, 2-hydroxypropyl metacrylate, tetrahydrofurfuryl metacrylate, 2-hydroxyethyl acrylate, 2-hydroxypropyl acrylate, 2,3-dihydroxy-2-methyl propyl methacrylate, tetrahydrofurfuryl acrylate, 2-etoxyethyl acrylate, diethylene glycol etoxylate acrylate, 3-methoxybutyl acrylate and the like), acryl amides (N-substituent) (meta) acrylamides such as N,N-dimethyl (meta) acrylamide, N,N dimethyl (meta) acrylamide and the like, N-vinyl pyrrolidone, N-vinyloxazolidone and the like.

The hydrophilic ethylene-based unsaturated monomer is preferably a meta(acrylate) including a hydrocarbon group or a carboxyl in the molecule and 2-hydroxyethyl metacrylate, 2-hydroxypropyl metacrylate, 2-hydroxyethyl acrylate and 2-hydroxypropyl acrylate are particularly preferable.

One type of these polymerizable monomers maybe used, or alternatively two or more types of these polymerizable monomers maybe used together to form copolymers with the ultraviolet light absorbing monomers.

Polymerization methods for obtaining the ultraviolet absorbent polymer in the invention are not specifically limited, but methods known heretofore can be widely used. These include a radical polymerization, an anion polymerization, and a cation polymerization and the like. Initiators of the radical polymerization include azo compounds, peroxide compound and the like, azobisisobutyronitrile (AIBN), azobisisobutyric acid diester derivatives, benzoyl peroxide, hydrogen peroxide and the like. Solvents used in the polymerization are not specifically limited, but include an aromatic hydrocarbon solvent such as toluene or chlorobenzene, a halogenated hydrocarbon solvent such as dichloroethane or chloroform, an ether solvent such as tetrahydrofuran or dioxane, an amide solvent such as dimethylformamide, an alcohol solvent such as methanol, an ester solvent such as methyl acetate or ethyl acetate, a ketone solvent such as acetone, cyclohexanone, methyl ethyl ketone and the like. Solution polymerization in a homogenous system, precipitation polymerization in which polymerization products precipitate, and emulsion polymerization in a micelle can be carried out by selecting solvents for polymerization. However, the ultraviolet light absorbing latex obtained by emulsion polymerization is not suitable for use as an optical film.

The proportion in which the ultraviolet light absorbing monomer, the polymerizable monomer that can form a copolymer therewith and the hydrophilic ethylene-based unsaturated polymer is suitably selected while giving consideration to the effect on compatibility of the obtained ultraviolet light absorbing copolymer and the other transparent polymer, as well as the transparency and mechanical strength of optical film.

The amount of the ultraviolet light absorbing monomer included in the polymer derived from the ultraviolet light absorbing monomer is preferably 1-70 percent by weight, and more preferably 5-60 percent by weight. If the amount of the ultraviolet light absorbing monomer in the ultraviolet light absorbing polymer is less than 1 percent by weight, in the case where the desired ultraviolet light absorbing properties seem to be insufficient, a large volume of ultraviolet light absorbing polymer must be used and transparency is reduced due to increased haze or sedimentation and the like, and this becomes a factor in the reduction of film strength. Meanwhile, if the amount of the ultraviolet light absorbing monomer in the ultraviolet light absorbing polymer exceeds 70 percent by weight, a transparent film cannot be obtained because compatibility with the other polymer is reduced. Also the degree of solubility in the solvent is lowered and operation and production properties deteriorate at the time of producing the film.

The amount of the hydrophilic ethylene-based unsaturated monomer included in ultraviolet light absorbing copolymer is preferably 0.1-50 percent by weight. If it is less than 0.1 percent by weight, the effect of improved compatibility due to hydrophilic ethylene-based unsaturated monomer is not seen, while if the amount is more than 50 percent by weight, purification of the copolymer by isolation becomes difficult. It is more preferable that the amount of the hydrophilic ethylene-based unsaturated monomer included is in the range of 0.5-20 percent by weight. In the case where the ultraviolet light absorbing monomer itself is substituted with a hydrophilic group, it is preferable that the total amount of the hydrophilic ultraviolet light absorbing monomer and the hydrophilic ethylene-based unsaturated hydrophilic ethylene-based unsaturated monomer is within the foregoing range.

In order for the ultraviolet light absorbing monomer and the hydrophilic monomer to be within the foregoing range, it is preferable that in addition to including both these substances, an ethylene-based monomer which does not have a hydrophilic group in the molecule is included the polymer.

Two types each of the ultraviolet light absorbing monomer and the (non hydrophilic or) hydrophilic and ethylene-based monomer may be mixed and polymerized.

The following is a detailed description of typical examples of the ultraviolet light absorbing monomer used in the present invention, but the invention is not to be limited by these examples.

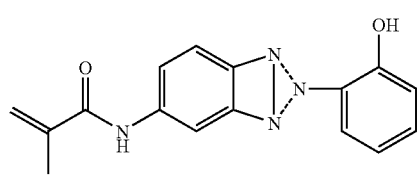

MUV-1

-continued

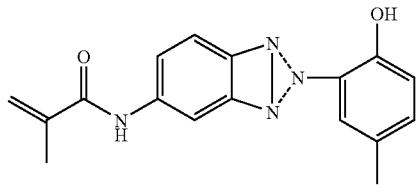

MUV-2

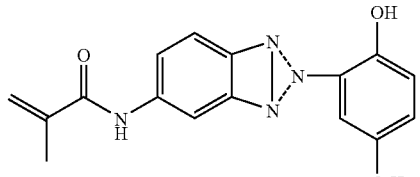

MUV-3

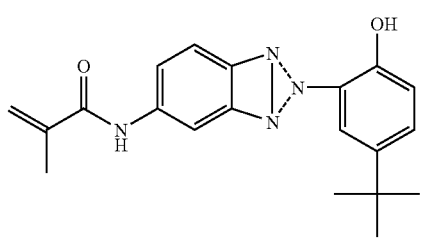

MUV-4

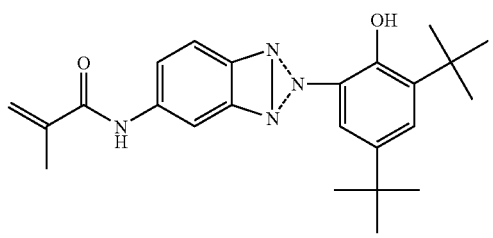

MUV-5

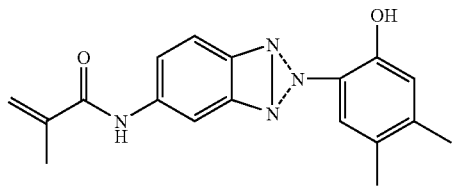

MUV-6

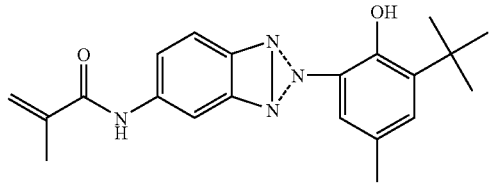

MUV-7

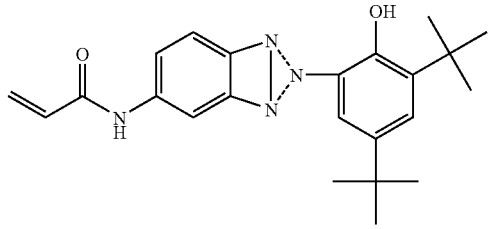

MUV-8

-continued
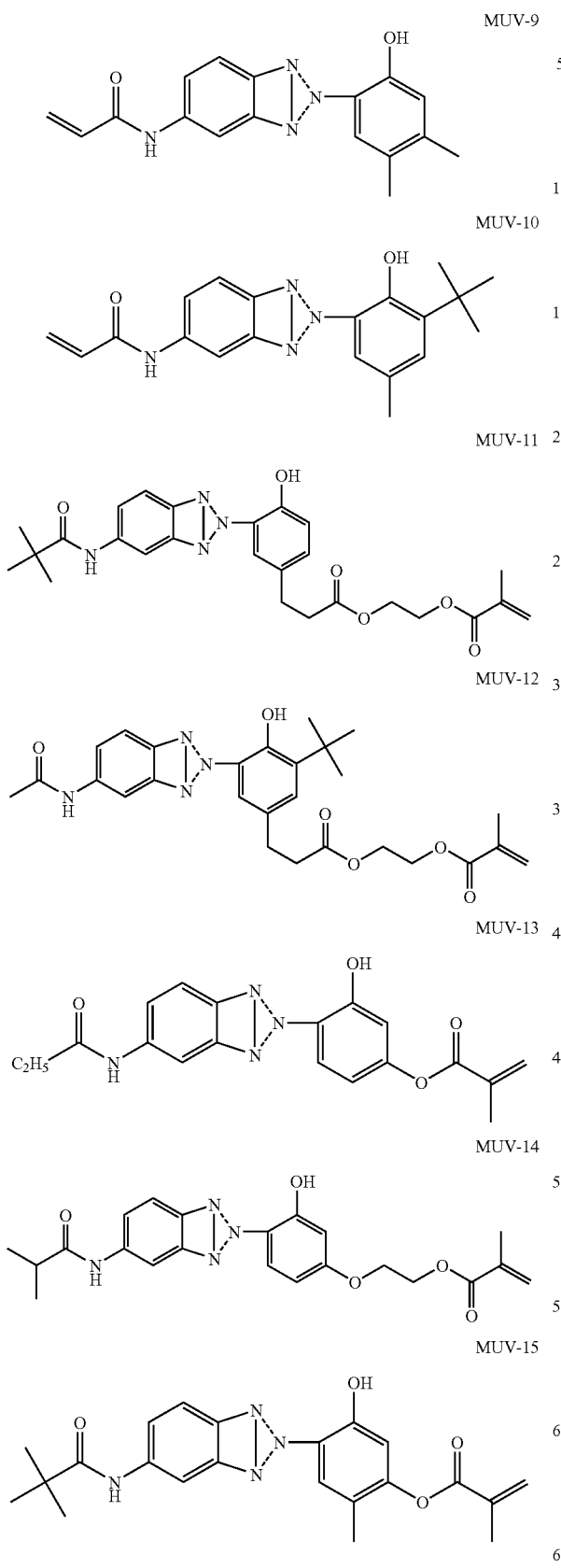
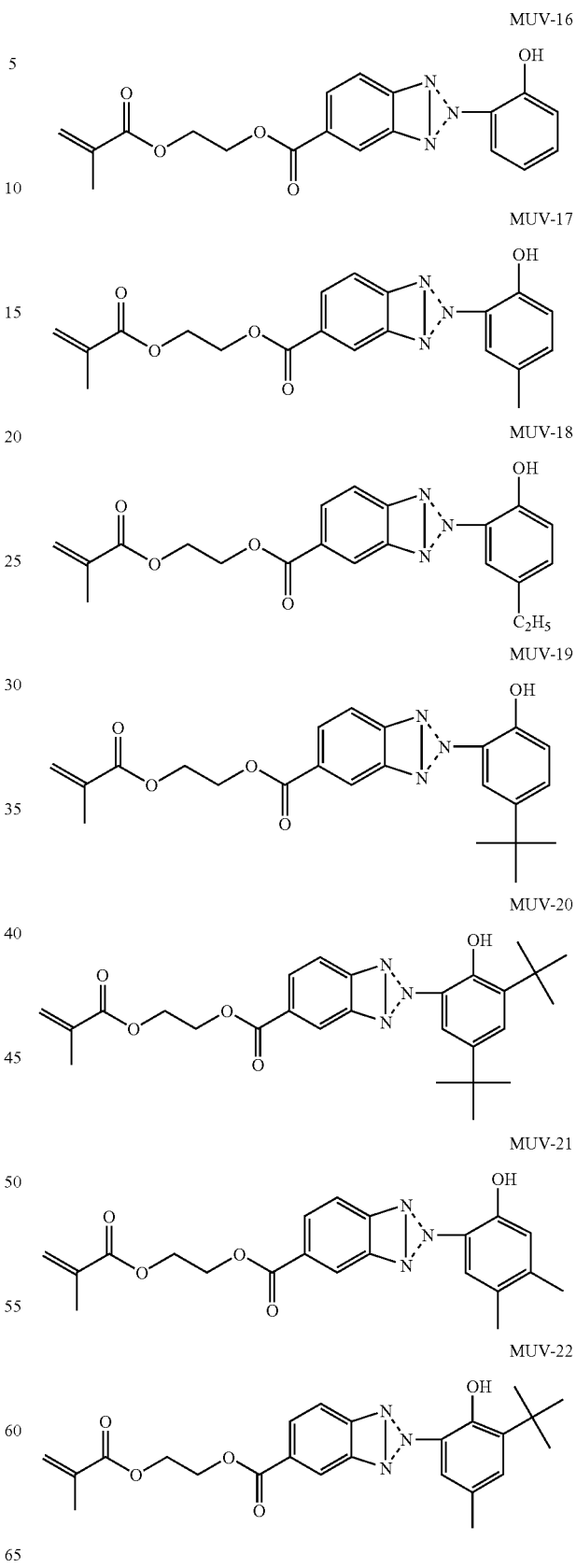

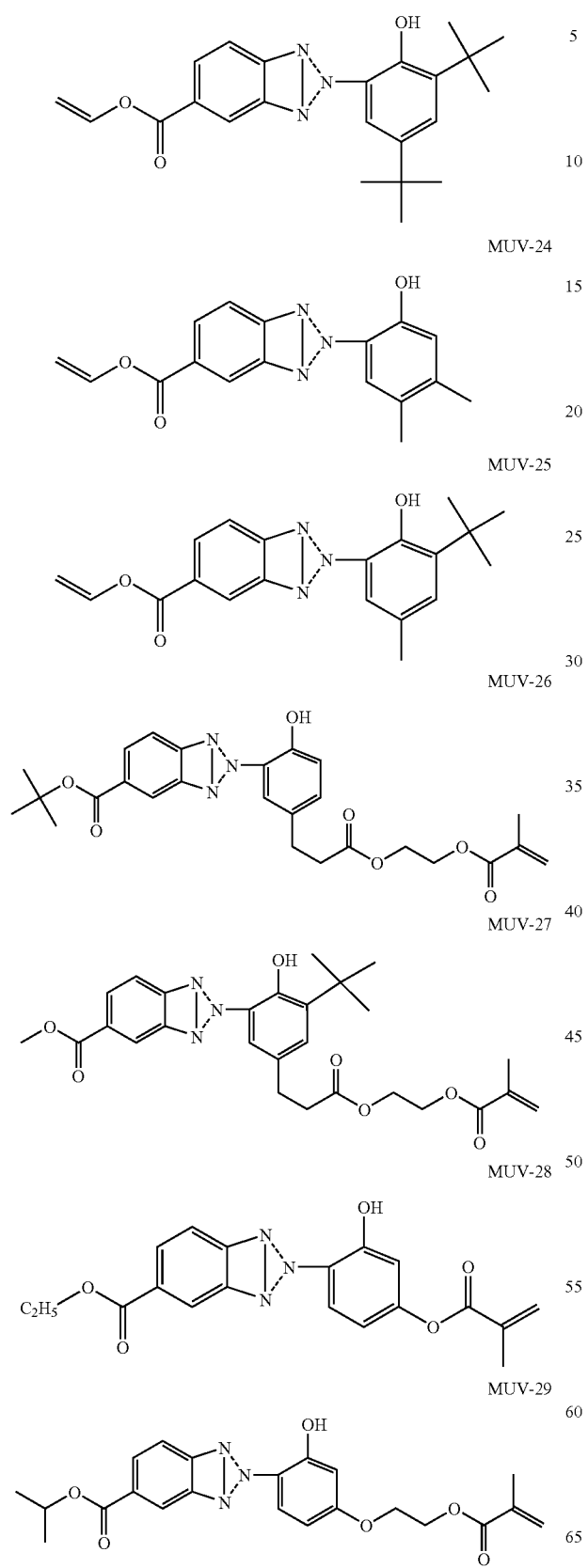

MUV-37
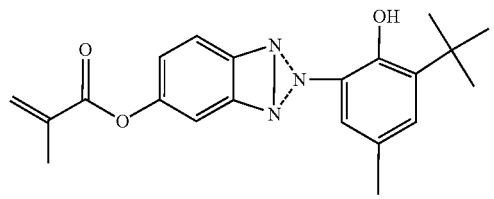
MUV-38
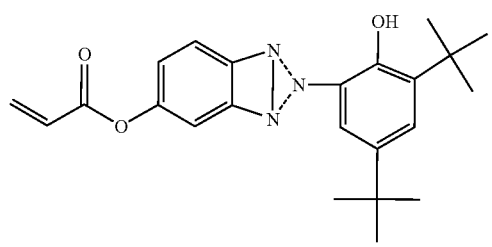
MUV-39
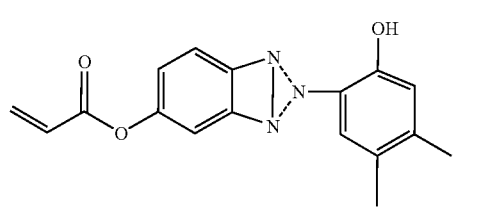
MUV-40
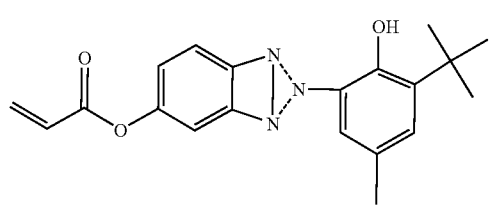
MUV-41
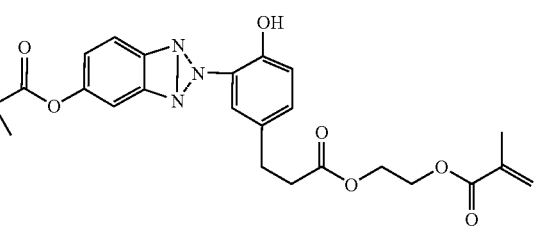
MUV-42
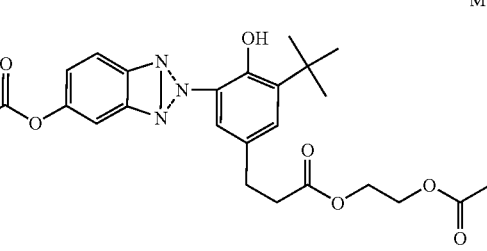
MUV-43
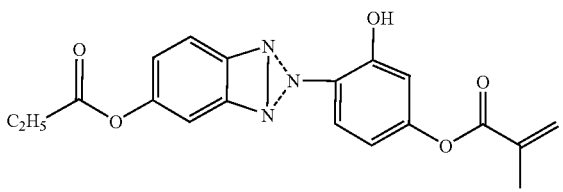
MUV-44
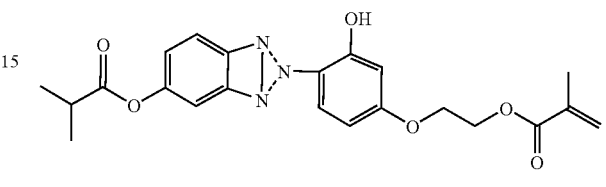
MUV-45
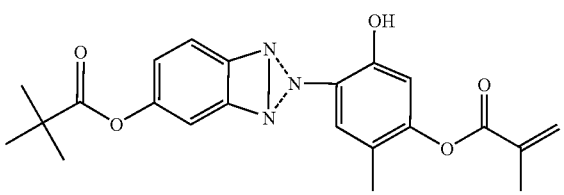
MUV-46
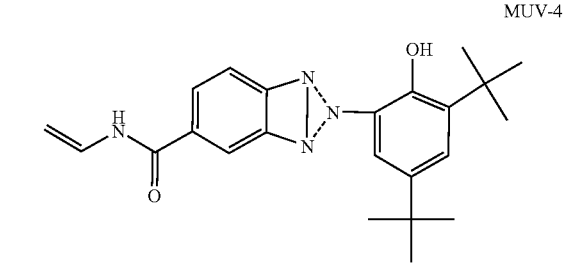
MUV-47
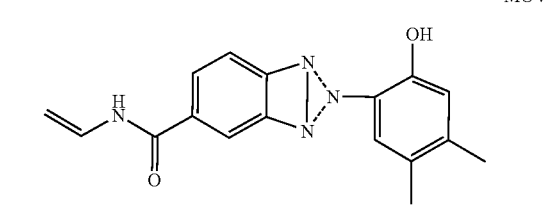
MUV-48
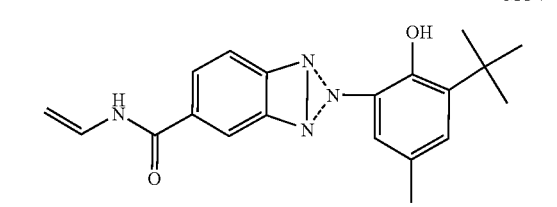
MUV-49
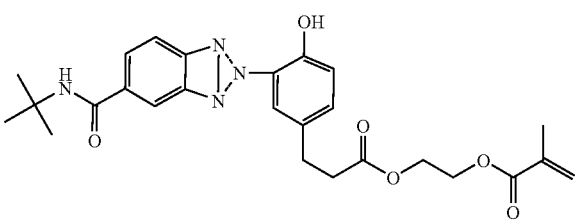

-continued

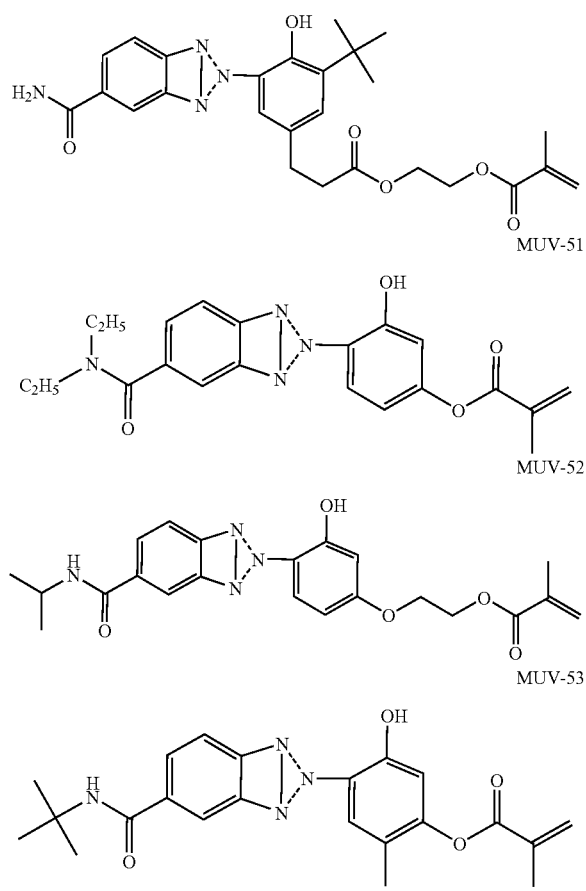

The ultraviolet light absorber used in this invention can be synthesized using an ultraviolet light absorbing monomer or an intermediate thereof which is disclosed in a known reference. Examples of documents which can be referred to for synthesizing the ultraviolet light absorber include U.S. Pat. Nos. 3,072,585, 3,159,646, 3,399,173, 3,761,272, 4,028,331, and No. 5,683,861, European Patent No. 86,300,416, Japanese Patent Application Laid-Open No. 63-227575 and 63-185969, Polymer Bulletin V.20 (2), 169-176 and Chemical Abstracts V.109, No. 191389.

When the ultraviolet light absorber and the ultraviolet light absorbing polymer used in this invention are mixed with the other transparent polymer, a low molecular weight compound, a high molecular weight compound or an inorganic compound may be used together as necessary. For example simultaneously mixing the ultraviolet light absorber used in the invention and another low molecular weight ultraviolet light absorber with another transparent polymer and mixing the ultraviolet light absorbing polymer used in the invention and the other low molecular weight ultraviolet light absorber with another transparent polymer is one preferable aspect of this invention. In the same manner, simultaneously mixing additives such as antioxidants, plasticizers and flame retardants is another preferable aspect of this invention.

The ultraviolet light absorber and the ultraviolet light absorbing polymer used in this invention may be added to an optical film by being included in the optical film or by being coated on the optical film. In the case of inclusion in the optical film, direct addition and in-line addition for which the production properties are excellent are favorable. The in-line addition is a method in which the ultraviolet light absorber and the ultraviolet light absorbing polymer are dissolved beforehand in an organic solvent (such as methanol, ethanol, methylene chloride and the like) and dissolved, and then added to the dope composition using an in-line mixer or the like.

The amount of the ultraviolet light absorber and the ultraviolet light absorbing polymer used in this invention is not fixed and depends of type of compound and the conditions for use. However, in the case of the ultraviolet light absorber, for 1 $m^2$ of optical film, the amount is preferably in the range of 0.2-3.0 g, more preferably 0.4-2.0 g and 0.5-1.5 g is particularly preferable. In the case of the ultraviolet light absorbing polymer, for 1 $m^2$ of optical film, it is preferably in the range of 0.6-9.0 g, more preferably 1.2-6.0 g and even more preferably 1.5-3.0 g.

From the viewpoint of preventing deterioration of the liquid crystal, a substance in which absorbance of ultraviolet light having a wavelength of no more than 380 nm is excellent, and from the viewpoint of favorable liquid crystal display properties a substance with little absorbance of visible light below 400 nm is preferable. In this invention, it is preferable that at a wavelength of 380 nm, transparency is not more than 8%, and preferably not more than 4% and transparency of not more than 1%. is particularly preferable.

The commercially available products that can be used in this invention as the ultraviolet light absorber include UVM-1 which is 1-(2-benzotriazole)-2-hydroxy-5-(2-vinyl oxycarbonyl ethyl)benzene, and reaction type ultraviolet light absorber RUVA-93-1 manufactured by Otsuka Chemical Company which is 1-(2-benzotriazole)-2-hydroxy-5-(2-metacryloyl oxyethyl)benzene or similar compounds. Polymers or copolymers of homopolymers may be used, but examples are not limited thereto. For example, PUVA-30M manufactured by Otsuka Chemical Co., Ltd is preferably used as the commercially available high molecular weight ultraviolet light absorber. Two or more types of the ultraviolet light absorber may be used. The method for adding the ultraviolet light absorber to the dope may be by dissolving the ultraviolet light absorber in an organic solvent such as alcohol, methyl chloride or dioxolane or methyl acetate, and then adding it to the dope, or alternatively the ultraviolet light absorber may be directly added to the dope composition.

An antioxidant may be included in the cellulose ester film of this invention. For example as described in Japanese Patent Application Laid-Open No. 5-197073, a peroxide decomposing agent, a radical chain-linking agent, or metal deactivator or an acid trapping agent may also be included. The amount in which these compounds are added is preferably in a weight ratio of 1 ppm-1.0%, and more preferably 10-1,000 ppm to the cellulose ester.

In this invention, it is preferable that a fine particle matting agent is included in the cellulose ester film, and examples of the fine particle matting agent include fine particles of inorganic compounds such as silicon dioxide, titanium dioxide, aluminum oxide, zirconium oxide, calcium carbonate, kaolin, talc, burned calcium silicate, hydrated calcium silicate, aluminum silicate, magnesium silicate, and calcium phosphate or cross-linked fine particles of high molecular weigh polymers Of these, silicon dioxide is preferable in view of reduced haze in the film. The average particle diameter of the secondary particles from among the fine particles is preferably in the range of 0.01-1.0 μm and the amount of these particles included is preferably in the range of 0.005-0.3 percent by weight of the cellulose ester. The particles such as the silicon dioxide particles are often surface treated using an organic substance, and this is preferable because it reduces haze in the film. Examples of the organic compound used in the surface treatment include halogens, alkoxysilanes (particularly alkoxysilanes having a methyl group), silazanes, and siloxanes. Particles having a larger average particle diameter have a greater matting effect, while particles having a smaller average particle diameter have excellent transparency. Thus among the particles, the primary particles preferably have an average primary particle size of 5-50 nm, and more preferably 7-16 nm. These particles are usually present in the cellulose ester film as an aggregate, and preferably form unevenness of 0.01-1.0 µm in the plane of the cellulose ester film. Examples of the silicon dioxide particles include Aerosil 200, 200V, 300, R972, R972V, R974, R202, R812, OX50, or TT600 (each manufactured by Aerosil Co., Ltd.), and of these, Aerosil 200V, R972, R972V, R974, R202, and R812, are preferred. Two or more of these matting agents may be combined and used. In the case where 2 or more matting agents are used, they may be mixed in a suitably selected proportion. In this case, matting agents which have different particle size and quality such as Aerosil 200V and R927V may be used in weight proportions in the range from 0.1:99.9 to 99.9:0.1

Next the method for preparing the cellulose ester dope of this invention will be described. Flakes of cellulose ester are stirred into the dissolution vessel with an organic solvent, which is the main good solvent for the cellulose ester, and thereby dissolved and the dope is formed. Examples of the dissolution method include a method which is performed at normal pressure; a method which is performed below the boiling point of the main solvent; a method which is performed by applying pressure below the boiling point of the main solvent; a method which is performed by cold dissolution as described in Japanese Patent Application Laid-Open No. 9-95544, No. 9-95557, or No. 9-95538; and various dissolution methods performed under high pressure as disclosed in Japanese Patent Application Laid-Open No. 11-21379. After dissolution, the dope is filtered with a filtering material and then defoamed and sent to the next step. The cellulose ester concentration in the dope is between 10 and 35 percent by weight, and more preferably between 15 and 25 percent. In order to include the polymer useful in this invention in a cellulose ester dope, the polymer is dissolved beforehand in an organic solvent and then added to the cellulose ester dope, and the method for addition, such as direct addition and the like is not limited. In this case the addition is done such that there is no cloudiness or phase separation of the polymer in the dope. The amount to be added is as described above.

Examples of good solvents of the cellulose ester include organic solvents such as, methyl acetate, ethyl acetate, amyl acetate, ethyl formate, acetone, cyclohexanone, methyl acetoacetata, tetrahydrofuran, 1,3-dioxolane, 4-methyl-1,3-dioxolane, 1,4-dioxane, 2,2,2-trifluoroethanol, 2,2,3,3-hexafluoro-l-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, 2-pyrrolidone, N-methyl-2-pyrrolidone, 1,3-dimethyl-2-imidazolidinone, methylene chloride, and bromopropane. Of these, methyl acetate, acetone and methylene chloride are preferably used. However, there is a tendency for non-chlorine organic solvents to be more preferable based on recent environmental issues. Low grade alcohols such as methanol, ethanol, butanol and the like can be favorably used along with these organic solvents, since they can improve the solubility of the cellulose ester in the organic solvent and reduce the viscosity of the dope. Ethanol in particular is favorable because of its low boiling point and it low toxicity. It is preferable that organic solvent used with the dope of this invention is a mixture of a good solvent and a poor solvent for cellulose ester in view of production efficiency, and a favorable range of proportion for mixing the good solvent and the poor solvent is 70-98 percent by weight of the good solvent and 2-30 percent by weight of the poor solvent. A good solvent in this invention is defined as a solvent that will dissolve the cellulose ester that is used on its own while a poor solvent is one that does not dissolve the cellulose ester on its own. The poor solvent used with the dope of this invention is not particularly limited, but examples of the solvent that is preferably used include methanol, ethanol, n-butanol, cyclohexane, acetone, cyclohexanone and the like. Selection of the organic solvent for the polymer used in this invention is also preferably a good solvent for cellulose ester. As described above, in the case where the low molecular weight plasticizer is used, conventional method for addition may be used and the plasticizer may be added directly to the dope or dissolved in an organic solvent beforehand and then poured into the dope.

When the various additives described above are added to the cellulose ester dope, it is preferable that a solution in which the cellulose ester dope and the various additives are dissolved in a small amount of the cellulose ester is blended by in-line addition. For example, an in-line mixer such as static mixer SWJ (Toray static in-line mixer, Hi-Mixer, manufactured by Toray Engineering) is preferably used. In the case where the in-line mixer is used, it is preferably applied to a dope in which the cellulose ester is subjected to concentrated dissolution under high pressure and in this case, a specific type of pressurizing container is required which is capable of withstanding a prescribed pressure, and which can be heated under pressure and in which stirring can be performed.

In this invention, by filtering the cellulose ester dope, foreign matter, particularly foreign matter that can be mistakenly identified as images in the liquid crystal image display device, are removed. It can be said that the quality of the polarizing plate protective film is determined by this filtration. It is preferable that the absolute filtration accuracy of the filtering material used in this filtration is small, but if the absolute filtration accuracy is too small, there is clogging of the filtration material is likely to occur, and thus the filtering material must be replaced frequently and this causes the problem of reduced productivity. As a result, the absolute filtration accuracy of filtering material for the cellulose ester dope of this invention is preferably in the range not mote than 0.008 mm, more preferably in the range of 0.001-0.008 mm, and still more preferably in the range of 0.003-0.006 mm. The quality of the filtering material is not particularly limited, and conventional filtering materials may be used. However, filtering material made from plastic fibers such as polypropylene, Teflon (registered trademark) and the like or filtering material made of metals such as stainless steel are preferable in the view of the fact that there is no falling out of the fibers. Filtration of the cellulose ester dope of this invention can be performed using conventional methods, but a method in which filtration is performed while heating under reduced pressure at a temperature which is less that the boiling point of the solvent at atmospheric pressure, and which is within a range in which the solvent does not boil is preferred in view of the fact that increase in differential pressure after filtration (referred to as filtration pressure hereinafter) is small. The preferable temperature range is 45-120° C., more preferably 45-70° C., and still more preferably 45-55° C. The filtration pressure is preferably small. The filtration pressure is preferably no greater than $1.6 \times 10^6$ Pa, more preferably no greater than $1.2 \times 10^6$ Pa, and still more preferably, no greater than $1.0 \times 10^6$ Pa. Including an unsubstituted acyl group or a cellulose ester with a low degree of substitution in raw material for the cellulose ester, sometimes causes foreign material obstruction (sometimes called luminance point hereinafter). A polarizing film was placed between two cellulose ester film samples arranged in a crossed state (crossed Nicol state). The luminance point is a phenomenon which occurs when light was irradiated from one side and observed from the other side using an optical microscope (50 magnification) and if the cellulose ester film is a normal one, light is blocked and there is darkness and nothing can be seen, while if foreign material is present, light leaks from that area and luminance appears as spots. Actual damage when the cellulose ester film is used as a liquid crystal image display device is large to the extent that that the diameter of the luminance point is large, and the diameter of the luminance point should be no greater than 50 µm, preferably no greater than 10 µm, and still more preferably no greater than 8 µm. It is to be noted that the diameter of the luminance point is the diameter that is measured when the luminance point is approximated to a perfect circle. If the diameter of the luminance point defined here is 400/cm² or less, there are no problems in terms of practical use, the diameter is preferably 300/cm² or less, and more preferably 200/cm² or less. In order to reduce the amount and size of these luminance spots, it is necessary to properly filter fine foreign material. Also, as described in Japan Patent Application Laid-Open No. 2000-137115, the method in which a crushed cellulose ester film which has been formed are added again in the proportion of the dope and used as the materials for the cellulose ester and the additives is preferably used as the luminance spots are reduced.

Next, the process for casting the cellulose ester dope on a metal support, the drying process for drying on the metal support, and the peeling process for peeling the web from the metal support will be described. The metal support body is an endless metal belt which can move infinitely or a rotating metal drum with the surface thereof being a mirror surface. The casting process is one in which a dope is pumped to a pressure die through a pressure type metering gear pump, and cast from the pressure die onto a metal support at a casting position. Another casting process is a doctor blade method in which the thickness of the cast dope film is adjusted with a blade or a method using reverse roll coater in which the dope thickness of the cast dope is adjusted with a reverse roller coater rotating reversely. A pressure die is preferred in view of the fact that the slit shape at the opening portion can be regulated and the film thickness is readily regulated to be uniform. Examples of the pressure die include a coat hanger die, a "T" die, and the like, and any of these maybe favorably employed. In order to increase the casting speed, two or more pressure dies may be provided on the metal support and dopes divided into two or more may be cast on the metal support and the dope amount may be divided and layered. The thickness of the film may be controlled to a desired thickness by controlling the dope concentration, the amount of dope pumped, the space of the slit in the die opening, the push-out pressure of the die, the speed of the metal support body and the like.

The drying process performed on the metal support is one in which a web (a dope film which is formed after a dope is cast on a metal support is called a web) is heated on a support and solvents are evaporated. Methods for evaporating solvents, include a method in which hot air is blown from the web side and the backside of the support, a method in which heating is carried out from the back surface of the support using heat transfer by liquid, and a method in which heating is carried out from the surface as well as the back surface using heat radiation. Further, these methods are preferably combined. If the web is thin, drying is quick. The temperature of the support may be the same along the entire support or may be different depending on the position.

The method for performing drying on the metal support which is used in this invention, is preferably a method in which casting is done on the metal support at a temperature of 0-40° C., and more preferably at a temperature of 5-30° C. The air for drying the web is preferably 30-45° C., but is not limited thereto.

The peeling process is one in which a web, in which the organic solvents have been evaporated on the support, is peeled prior to conveying of the metal support. The peeled web is sent to the drying process. The position at which the web is peeled from the metal support is called the peeling point, and the rollers which aid in the peeling are called peeling rollers. This phenomenon depends on the thickness of the web, but when the residual solvent amount (represented by the formula described below) is too large, it may be difficult to peel the web. On the contrary, when peeling is carried out after fully drying the web on the support, a part of the web may peel before the peeling position. It is generally preferable that web peeling is performed when the residual solvent amount is 20 to 150 percent by weight. The residual solvent amount in this invention when the film is peeled is preferably 20-40 percent by weight or 60-120 percent by weight, and 20-30 percent by weight or 70-115 percent by weight is particularly preferable. One method for increasing the speed of film production (the film production speed can be increased because the peeling is performed when the residual solvent amount is a much as possible) is a gel casting method in which peeling can be done even when the residual solvent amount is high. The gel casting methods include a method in which poor solvents with respect to the cellulose ester are added to a dope and gelling is carried out after casting the dope, and also a method in which gelling is carried out by decreasing the temperature of a support, and the like. There is further a method in which metal salts are added to the dope. By strengthening the web film through gelling the dope on the support, it is possible to carry out earlier peeling and to increase the film formation speed. When the peeling is carried out at the time when the residual solvent amount is still great, the web may be too soft, and during peeling, the flatness of the web is compromised, and formation of wrinkles and longitudinal streaks due to the peeling tension become likely. Accordingly, the residual solvent amount is determined such that economic operation and quality are balanced.

The residual solvent amount used in this invention is expressed by the formula below.

$$\text{Residual solvent amount (percent by weight)} = \{(M-N)/N\} \times 100$$

In the formula M represents the weight of the web at a suitably selected point and N represents the weight when M is dried for 3 hours at 110° C.

Furthermore, it is preferable that in the process for drying the cellulose ester film, the film that has been peeled from the support is further dried to cause the residual solvent amount to 2.0 percent by weight or less, and more preferably 1.0 percent by weight or less, and still more preferably 0.5 percent by weight or less.

In the drying process, the web is dried by employing a method in which the web is conveyed through a staggered rolling and drying device or a tenter drying device in which the web is conveyed while holding both edges of the web using clips and maintaining web width or slightly stretching the web in the width direction. In this invention, it is particularly favorable to maintain or stretch the web width in a suitably selected process subsequent to peeling of the web by the tenter drying device and at a suitably selected point where the residual solvent amount is great, since humidity stability of the optical properties are favorable. The means for drying the web is not particularly limited and the drying is generally carried out by hot air, infrared rays, heat rolling or microwaves. It is preferable that the drying is performed by hot air in view of simplicity. The drying temperature is preferably gradually increased in the range from 40 to 150° C. and more preferably in the range from 50 to 140° C.

It is to be noted that the stretching operation may be performed in a number of stages and the web is preferable stretched biaxially in the casting direction and the width direction. Furthermore, biaxial stretching may be performed simultaneously or gradually. In this case gradually means that, for example, stretching in different directions can be performed sequentially, or stretching in the same direction can be performed in many stages and then the stretching in the different direction is added at the end of any of those stages.

Simultaneous biaxial stretching also includes the case in which stretching in one direction is performed and the tension in the other direction is relaxed so that the web shrinks. It is particularly preferable that the simultaneous biaxial stretching is done by a factor ×1.05-1.5 times in the width direction and ×0.8-1.3 times in the longitudinal direction (stretching direction), and by a factor of x 1.1-1.5 times in the width direction and ×0.8-0.99 times in the longitudinal direction. Particularly preferable is a factor of ×1.1-1.4 times in the width direction and ×0.9-0.99 times in the longitudinal direction.

It is preferable that the cellulose ester film is thin, as the resulting polarizing plate is also thin, and this causes a thin liquid crystal display film to be readily achieved. However if the film is too thin, transparency and tear strength deteriorate. The thickness of the cellulose ester film that achieves a balance between the two is preferably 10-200 μm, more preferably 40-120 μm, and 50-70 μm is particularly preferable.

The width of the cellulose ester film is no less than 1.4 m, and more preferably in the range of 1.4-4 m in view of productivity in that a large liquid crystal display device is obtained.

The cellulose ester film of the invention is preferably used in liquid crystal display member in view of good moisture vapor permeation and dimensional stability. The liquid crystal display member is a member used in a liquid crystal display and examples thereof include a polarizing plate, a polarizing plate protective film, a phase difference plate, a reflection plate, a visual angle improvement film, a glare film, a non-reflective film, an antistatic film and the like. Of these, the cellulose ester film of this invention is preferably used in a polarizing plate or a polarizing plate protective film.

(Polarizing Plate)

The cellulose ester film of this invention which was prepared is subjected to surface saponificaton treatment for 60 seconds with a 2.5 mol/l aqueous solution of sodium hydroxide at 40° C. and then washed with water for 3 minutes. and then dried. A polyvinyl alcohol layer of a thickness of 120 μm is separately immersed in a 100 parts by weight aqueous solution including 1 part by weight of iodine and 4 parts by weight of boric acid and a polarizing film which was stretched by a factor of 4 in the vertical direction at a temperature of 50° C. is thereby prepared. The cellulose ester film that has been subjected to the foregoing surface saponification treatment is laminated onto both sides of the resultant film with 5 percent by weight aqueous solution of the completely saponified polyvinyl alcohol as an adhesive, and the polarizing plate is thereby prepared.

In the stretched cellulose ester film which is the polarizing plate protective film of this invention, the retardation value Ro which is defined by formula (1) below is in the range of 30-200 nm and the retardation value Rt which is defined by formula (2) below is in the range of 70-400 nm.

$$Ro = (nx-ny) \times d \qquad \text{Formula (1)}$$

$$Rt = \{(nx+ny)/2-nz\} \times d \qquad \text{Formula (2)}$$

In the formulas, nx represents a maximum refractive index in plane of the film, ny represents a refractive index in plane of the film in the direction at right angles to that of nx, nz represents refractive index in the thickness direction of the film, and represents a thickness (nm) of the film. When the retardation value is within the foregoing range, optical properties for the polarizing plate phase difference film in particular is satisfactory.

It is to be noted that the retardation values Ro and Rt can be done using an automatic birefringence meter. For example, the measurement can be done using KOBRA-21ADH (manufactured by Oji Measuring Instruments Co., Ltd.) in an environment where the temperature is 23° C. and 55% RH with light of a wavelength of 590 nm.

It is preferable that even after the polarizing plate protective film of this invention is subjected to saponification treatment, the light transmittance (of visible light) is not less than 90%, and more preferably not less than 95% and still more preferably not less than 94%. In addition it is preferable that the haze is less than 1%, more preferably less than 0.5%, and still more preferable less than 0.1%. An amount of haze of 0% is most preferable.

(Display Device)

By incorporating the polarizing plate of this invention into a display device, display devices of this invention having various excellent visibility properties can be produced. The cellulose ester film of this invention can be favorably used in various drive type LCDs such a reflection type, a transparent type, a semi-transparent type or a TN type, an STN type, an OCB type, a HAN type, a VA type (PVA type or MVA type) and an IPS type and the like. The polarizing plate is particularly favorably applied to a VA type liquid crystal display device.

In particular, in the large screen VA type liquid crystal display device for which there are 30 or larger types of screen, in addition to the effect that optical properties such as humidity stability are improved, there is also the effect that the eyes do not become tired after long periods of viewing.

EXAMPLE

This invention will be described more specifically using the following examples, but this invention is not to be limited by these examples.

Polyester Polyol Synthesis Example A1

A reaction vessel equipped with a cooling condenser was charged with 236 parts by weight of ethylene glycol, 683 parts by weight of 1,4-butylene glycol, 1,180 parts by weight of succinic acid, and 0.03 parts by weight tetrabutyl titanate. The dehydration reaction was performed for 2 hours at 140° C. and then for 2 hours at 220° C., and then for 20 hours at 220° C. with the cooling condenser removed and the polyester polyol synthesis example (A1) with a number average molecular weight of 2,000 was obtained. The average number of carbon atoms in the glycol (a) that was used was 3.33, while the average number of carbon atoms in the dibasic acid (b) was 4.

Polyester Polyol Synthesis Example A2

A reaction vessel equipped with a cooling condenser was charged with 699 parts by weight of ethylene glycol, 1,180 parts by weight of succinic acid, and 0.03 parts by weight tetrabutyl titanate. The same operations as those for the polyester polyol synthesis example (A1) were performed to obtain a polyester polyol (A2) with a number average molecular weight of 2,000. The average number of carbon atoms in the glycol (a) that was used was 2, while the average number of carbon atoms in the dibasic acid (b) was 4.

Polyester Polyol Synthesis Example A3

A reaction vessel equipped with a cooling condenser was charged with 702 parts by weight of ethylene glycol, 885 parts by weight of succinic acid, 365 parts by weight of adipidic acid and 0.03 parts by weight tetrabutyl titanate. The same operations as those for the polyester polyol synthesis example (A1) were performed to obtain a polyester polyol (A3) with a number average molecular weight of 2,000. The average number of carbon atoms in the glycol (a) that was used was 2, while the average number of carbon atoms in the dibasic acid (b) was 4.5.

Polyester Polyol Synthesis Example A4

A reaction vessel equipped with a cooling condenser was charged with 631 parts by weight of ethylene glycol, 101 parts by weight of 1,4-butylene glycol, 1,062 parts by weight of succinic acid, 146 parts by weight of adipidic acid and 0.03 parts by weight tetrabutyl titanate. The same operations as those for the polyester polyol synthesis example (A1) were performed to obtain a polyester polyol (A4) with a number average molecular weight of 2,000. The average number of carbon atoms in the glycol (a) that was used was 2.2, while the average number of carbon atoms in the dibasic acid (b) was 4.2.

Polyester Polyol Synthesis Example A5

A reaction vessel equipped with a cooling condenser was charged with 226 parts by weight of ethylene glycol, 656 parts by weight of 1,4-butylene glycol, 1,180 parts by weight of succinic acid, and 0.03 parts by weight tetrabutyl titanate. The same operations as those for the polyester polyol synthesis example (A1) were performed to obtain a polyester polyol (A5) with a number average molecular weight of 4,000. The average number of carbon atoms in the glycol (a) that was used was 3.33, while the average number of carbon atoms in the dibasic acid (b) was 4.

Polyester Polyol Synthesis Example A6

A reaction vessel equipped with a cooling condenser was charged with 249 parts by weight of ethylene glycol, 721 parts by weight of 1,4-butylene glycol, 1,180 parts by weight of succinic acid, and 0.03 parts by weight tetrabutyl titanate. The same operations as those for the polyester polyol synthesis example (A1) were performed to obtain a polyester polyol (A6) with a number average molecular weight of 1,200. The average number of carbon atoms in the glycol (a) that was used was 3.33, while the average number of carbon atoms in the dibasic acid (b) was 4.

Polyester Polyol Synthesis Example A7

A reaction vessel equipped with a cooling condenser was charged with 648 parts by weight of ethylene glycol, 58 parts by weight of diethylene glycol, 1,121 parts by weight of succinic acid, 83 parts by weight of terephthalic acid and 0.03 parts by weight tetrabutyl titanate. The same operations as those for the polyester polyol synthesis example (A1) were performed to obtain a polyester polyol (A7) with a number average molecular weight of 3,000. The average number of carbon atoms in the glycol (a) that was used was 2.1, while the average number of carbon atoms in the dibasic acid (b) was 4.2.

Polyester Polyol Comparative Synthesis Example B1

A reaction vessel equipped with a cooling condenser was charged with 238 parts by weight of ethylene glycol, 693 parts by weight of 1,4-butylene glycol, 1,460 parts by weight of adipidic acid and 0.03 parts by weight tetrabutyl titanate. The same operations as those for the polyester polyol synthesis example (A1) were performed to obtain a polyester polyol (B1) with a number average molecular weight of 2,000. The average number of carbon atoms in the glycol (a) that was used was 3.33, while the average number of carbon atoms in the dibasic acid (b) was 6.

Polyester Polyol Comparative Synthesis Example B2

A reaction vessel equipped with a cooling condenser was charged with 1,030 parts by weight of 1,4-butylene glycol, 1,180 parts by weight of succinic acid and 0.03 parts by weight tetrabutyl titanate. The same operations as those for the polyester polyol synthesis example (A1) were performed to obtain a polyester polyol (B2) with a number average molecular weight of 2,000. The average number of carbon atoms in the glycol (a) that was used was 4, while the average number of carbon atoms in the dibasic acid (b) was 4.

Polyester Polyol Comparative Synthesis Example B3

A reaction vessel equipped with a cooling condenser was charged with 706 parts by weight of ethylene glycol, 1,460 parts by weight of adipidic acid and 0.03 parts by weight tetrabutyl titanate. The same operations as those for the polyester polyol synthesis example film (A1) were performed to obtain a polyester polyol (B3) with a number average molecular weight of 2,000. The average number of carbon atoms in the glycol (a) that was used was 2, while the average number of carbon atoms in the dibasic acid (b) was 6.

[Preparation of the Cellulose Ester Film Sample]

The cellulose esters, the additives, the fine particles and solvents in Table 1 are used to prepare cellulose ester solutions with dope compositions shown in Table 2.

It is to be noted that C2 (high molecular weight polymer UV absorber P-1) and D2 (high molecular weight polymer UV absorber P-2) of the additive 2 of Table 1 are synthesized by the methods described below.

(High Molecular Weigh Polymer UV Absorber P-1 Synthesis)

2(2'-hydroxy-5'-t-butyl-phenyl)-5-carbonic acid-(2-methacryloyloxy)ethyl ester-2H-benzotriazole (sample compound MUV-19) was prepared using the method described below.

20.0 g of 3-nitro-4-amino-benzoic acid are dissolved in 160 ml of water and 43 ml of concentrated hydrochloric acid were added. After 8.0 g of sodium nitrile that has been dissolved in 20 ml of water is added at 0° C., the resultant solution is stirred for 2 hours with the temperature kept at 0° C. A solution formed by dissolving 17.3 g of 4-t-butyl phenol in 50 ml of water and 100 ml of ethanol into is dropped in the solution at 0° C. while keeping the solution alkaline using potassium carbonate. The resultant solution is stirred at 0° C. for 1 hour and the further stirred at room temperature for 1 hour. The reaction solution is then made acidic using hydrochloric acid and the precipitate that is formed is filtered and then washed well in water.

The filtered precipitate is dissolved in 500 ml of a 1 mol/L aqueous solution of NaOH and 35 g of zinc powder is added and then 110 g of an aqueous solution of 40% NaOH is dropped in. After the dropping the resultant solution is stirred for approximately 2 hours and then filtered and washed with water and the filtrate is neutralized using hydrochloric acid. The deposited suspension is filtered, washed with water and dried and then recrystallization is performed using a blended solvent of ethyl acetate and acetone and 2(2'-hydroxy-5'-t-butyl-phenyl)-5-carbonic acid-2H-benzotriazole is obtained.

Next, 10.0 g of 2(2'-hydroxy-5'-t-butyl-phenyl)-5-carbonic acid-2H-benzotriazole and 0.1 g of hydroxyquinone, 4.6 g of 2-hydroxyethyl metacrylate and 0.5 g of p-toluene sulfonic acid are added to 100 ml of toluene and heat irrigation is performed for 10 hours in a reaction vessel that is equipped with an esterification tube. The reactant solution is poured into water and the deposited crystals are filtered and washed and then dried, and 2(2'-hydroxy-5'-t-butyl-phenyl)-5-carbonic acid-(2-methacryloyloxy)ethyl ester-2H-benzotriazole which is the sample compound MUV-19 is obtained by re-crystallizing with ethyl acetate.

Next, a copolymer of 2(2'-hydroxy-5'-t-butyl-phenyl)-5-carbonic acid-(2-methacryloyloxy)ethyl ester-2H-benzotriazole and methyl methacrylate (high molecular weight UV absorber P-1) is synthesized using the method described below.

4.0 g of 2(2'-hydroxy-5'-t-butyl-phenyl)-5-carbonic acid-(2-methacryloyloxy)ethyl ester-2H-benzotriazole and 6.0 g of methyl methacrylate which were prepared in Synthesis Example 3 above were added to 80 ml of tetrahydrofuran and then 1.14 g of the azoisobutrylonitryl were added. The resultant was then subjected to heat refluxing for 9 hours in a nitrogen environment. After the tetrahydrofuran is subjected to reduced pressure distillation, the resultant is dissolved again in 20 ml of tetrahydrofuran and dropped into excess methanol. The deposited sediments are filtered off and subjected to vacuum drying at 40° C. and 9.1 g of the high molecular weight UV absorber P-1 which is a gray colored powdered copolymer is obtained. This copolymer is confirmed to have a number molecular weight of 4,500 by GPC analysis which uses standard polystyrene as a reference. Also the foregoing copolymer is confirmed to be a copolymer of 2(2'-hydroxy-5'-t-butyl-phenyl)-5-carbonic acid-(2-methacryloyloxy)ethyl ester-2H-benzotriazole and methyl methacrylate based on the NMR spectrum and the UV spectrum. The composition of the foregoing copolymer is essentially 2(2'-hydroxy-5'-t-butyl-phenyl)-5-carbonic acid-(2-methacryloyloxy)ethyl ester-2H-benzotriazole: methyl methacrylate in a ratio of 40:60.

High polymer UV Absorber P-2 Synthesis Example

High polymer UV Absorber P-2 is synthesized using the same process for High polymer UV Absorber P-1 except that 6.0 g of methyl methacrylate is replaced by 5.0 g of methyl methacrylate and 1.0 g of hydroxyethyl methacrylate. The number molecular weight is 4,500. In addition, the composition of the foregoing copolymer is essentially 2(2'-hydroxy-5'-t-butyl-phenyl)-5-carbonic acid-(2-methacryloyloxy)ethyl ester-2H-benzotriazole: methyl methacrylate: hydroxyethyl methacrylate in a ratio of 40:50:10.

TABLE 1

| Cellulose ester | Degree of substitution | Total degree of substitution | Molecular weight (Mn) |
|---|---|---|---|
| A | Degree of acetyl group substitution 2.85 | 2.85 | 100,000 |
| B | Degree of acetyl group substitution 2.78 | 2.78 | 90,000 |
| C | Degree of acetyl group substitution 2.00, degree of propionyl substitution 0.78 | 2.78 | 70,000 |
| D | Degree of acetyl group substitution 1.90, degree of propionyl substitution 0.82 | 2.72 | 70,000 |
| E | Degree of acetyl group substitution 1.74, degree of propionyl substitution 0.86 | 2.6 | 90,000 |
| F | Degree of acetyl group substitution 1.74, degree of propionyl substitution 0.76 | 2.5 | 80,000 |
| G | Degree of acetyl group substitution 1.58, degree of propionyl substitution 0.85 | 2.43 | 110,000 |
| H | Degree of acetyl group substitution 1.49, degree of propionyl substitution 0.82 | 2.31 | 100,000 |
| I | Degree of acetyl group substitution 2.51 | 2.51 | 100,000 |
| J | Degree of acetyl group substitution 2.32 | 2.32 | 110,000 |

| Additive 1 | | Molecular weight (Mn) |
|---|---|---|
| A1 | Polyester polyol synthesis example A1 | 2,000 |
| B1 | Polyester polyol synthesis example A2 | 2,000 |
| C1 | Polyester polyol synthesis example A3 | 2,000 |
| D1 | Polyester polyol synthesis example A4 | 2,000 |
| E1 | Polyester polyol synthesis example A5 | 4,000 |
| F1 | Polyester polyol synthesis example A6 | 1,200 |
| G1 | Polyester polyol synthesis example A7 | 3,000 |
| H1 | Polyester polyol comparitive synthesis example B1 | 2,000 |
| I1 | Polyester polyol comparitive synthesis example B2 | 2,000 |
| J1 | Polyester polyol comparitive synthesis example B3 | 2,000 |
| K1 | Triphenyl phosphate | 326 |
| L1 | Ethyl futaryl ethyl glycolate | 280 |

| Additive 2 | | Molecular weight (Mn) |
|---|---|---|
| A2 | Tinuvin 109 (manufactured by Chiba Specialty Chemical Co., Ltd.) | 486 |

-continued

| | | |
|---|---|---|
| B2 | Tinuvin 171 (manufactured by Chiba Specialty Chemical Co., Ltd.) | 694 |
| C2 | High molecular weight polymer UV absorber P-1 | 4,500 |
| D2 | High molecular weight polymer UV absorber P-2 | 4,500 |

Fine particles

| | |
|---|---|
| Fine particles A | Aerosil R972V (manufactured by Aerosil Co., Ltd.) |

Solvent

| | |
|---|---|
| A | 440 parts by weight of methylene chloride, 35 parts by weight of ethanol |
| B | 400 parts by weight of methylene chloride, 75 parts by weight of ethanol |

However, solvent is charged to a sealed container and the remaining material is charged while stirring. The resultant is blended by heating and stirring until dissolution is complete. The fine particles are dispersed with some of the solvent and then added. The solution is cooled to a temperature for casting the solution and then left to stand still, and after the defoaming operation is carried out, the solution is filtered using Asaka filter paper No. 244 manufactured by Asaka Filter Paper Company Limited and each of the cellulose ester solutions are thereby obtained.

Next, the cellulose ester solution that has been prepared at a temperature of 33° C. is fed to a die and uniformly cast from the die slit onto the stainless steel belt. The back surface of the casting portion of the stainless steel belt was heated with hot water of a temperature of 37° C. After the casting, the dope film on the metal support (the casting on the stainless belt is called a web hereinafter) is dried with hot air at 44° C. and peeling is performed when the residual solvent amount at the time of peeling is 80 percent by weight. Stretching is then done such that tension is applied during peeling and the web is stretched by a prescribed factor. Next, the ends of the web are held by a tenter and stretched in the width direction by the stretching factors shown in table. After the stretching, the web is held for a few seconds with the width kept the same, and then the width direction tension is released and the hold of the width is released. Furthermore, the web is conveyed for 20 minutes in a third drying zone which is set at 110° C. and drying is performed. Cellulose ester film samples 1 to 30 having a prescribed thickness and having knurling of a width of 1.5 cm, width at the ends of 1.5 cm and height of 8 μm are thereby prepared.

The cellulose esters, the additives, the fine particles, the solvents and the like, as well as the stretching factors, and the thickness and width of the film for each of the cellulose ester films that are produced all shown in Table 2.

TABLE 2

| Cellulose ester film sample No. | Dope composition | | | | Fine particles | Solvent | Stretch factor | | Film thickness (μm) | Width (m) | Remarks |
|---|---|---|---|---|---|---|---|---|---|---|---|
| | Cellulose ester | Additive 1 | | Additive 2 | | | Longitudinal stretch right after peeling | Lateral stretch | | | |
| 1 | E(100 parts by weight) | A1(20) | — | D2(1.5) | — | A(0.2 parts by weight) | B | 1.05 | 1.3 | 80 | 1.5 | Inv. |
| 2 | E(100 parts by weight) | B1(20) | — | D2(1.5) | — | A(0.2 parts by weight) | B | 1.05 | 1.3 | 80 | 1.5 | Inv. |
| 3 | E(100 parts by weight) | C1(20) | — | D2(1.5) | — | A(0.2 parts by weight) | B | 1.05 | 1.3 | 80 | 1.5 | Inv. |
| 4 | E(100 parts by weight) | D1(20) | — | D2(1.5) | — | A(0.2 parts by weight) | B | 1.05 | 1.3 | 80 | 1.5 | Inv. |
| 5 | E(100 parts by weight) | E1(20) | — | D2(1.5) | — | A(0.2 parts by weight) | B | 1.05 | 1.3 | 80 | 1.5 | Inv. |
| 6 | E(100 parts by weight) | F1(20) | — | D2(1.5) | — | A(0.2 parts by weight) | B | 1.05 | 1.3 | 80 | 1.5 | Inv. |
| 7 | E(100 parts by weight) | G1(20) | — | D2(1.5) | — | A(0.2 parts by weight) | B | 1.05 | 1.3 | 80 | 1.5 | Inv. |
| 8 | E(100 parts by weight) | H1(20) | — | D2(1.5) | — | A(0.2 parts by weight) | B | 1.05 | 1.3 | 80 | 1.5 | Comp. |
| 9 | E(100 parts by weight) | I1(20) | — | D2(1.5) | — | A(0.2 parts by weight) | B | 1.05 | 1.3 | 80 | 1.5 | Comp. |
| 10 | E(100 parts by weight) | J1(20) | — | D2(1.5) | — | A(0.2 parts by weight) | B | 1.05 | 1.3 | 80 | 1.5 | Comp. |
| 11 | E(100 parts by weight) | K1(8) | L1(2) | D2(1.5) | — | A(0.2 parts by weight) | B | 1.05 | 1.3 | 80 | 1.5 | Comp. |
| 12 | E(100 parts by weight) | K1(16) | L1(4) | D2(1.5) | — | A(0.2 parts by weight) | B | 1.05 | 1.3 | 80 | 1.5 | Comp. |
| 13 | A(100 parts by weight) | G1(20) | — | C2(1.5) | — | A(0.2 parts by weight) | A | 1.05 | 1.3 | 80 | 1.5 | Comp. |
| 14 | B(100 parts by weight) | G1(20) | — | C2(1.5) | — | A(0.2 parts by weight) | A | 1.05 | 1.3 | 80 | 1.5 | Inv. |
| 15 | C(100 parts by weight) | G1(20) | — | D2(1.5) | — | A(0.2 parts by weight) | B | 1.05 | 1.3 | 80 | 1.5 | Inv. |

TABLE 2-continued

| Cellulose ester film sample No. | Dope composition | | | | | | Stretch factor | | Film thickness (μm) | Width (m) | Remarks |
|---|---|---|---|---|---|---|---|---|---|---|---|
| | Cellulose ester | Additive 1 | Additive 2 | | Fine particles | Solvent | Longitudinal stretch right after peeling | Lateral stretch | | | |
| 16 | D(100 parts by weight) | G1(20) | — | D2(1.5) | — | A(0.2 parts by weight) | B | 1.05 | 1.3 | 80 | 1.5 | Inv. |
| 17 | F(100 parts by weight) | G1(20) | — | D2(1.5) | — | A(0.2 parts by weight) | B | 1.05 | 1.3 | 80 | 1.5 | Inv. |
| 18 | G(100 parts by weight) | G1(20) | — | D2(1.5) | — | A(0.2 parts by weight) | B | 1.05 | 1.3 | 80 | 1.5 | Inv. |
| 19 | H(100 parts by weight) | G1(20) | — | D2(1.5) | — | A(0.2 parts by weight) | B | 1.05 | 1.3 | 80 | 1.5 | Inv. |
| 20 | I(100 parts by weight) | G1(20) | — | C2(1.5) | — | A(0.2 parts by weight) | A | 1.05 | 1.3 | 80 | 1.5 | Inv. |
| 21 | J(100 parts by weight) | G1(20) | — | C2(1.5) | — | A(0.2 parts by weight) | B | 1.05 | 1.3 | 80 | 1.5 | Inv. |
| 22 | E(100 parts by weight) | G1(20) | J1(3) | D2(1.5) | — | A(0.2 parts by weight) | B | 1.05 | 1.3 | 80 | 1.5 | Inv. |
| 23 | E(100 parts by weight) | G1(20) | J1(2) | D2(1.5) | — | A(0.2 parts by weight) | B | 1.05 | 1.3 | 80 | 1.5 | Inv. |
| 24 | E(100 parts by weight) | G1(20) | J1(1) | D2(1.5) | — | A(0.2 parts by weight) | B | 1.05 | 1.3 | 80 | 1.5 | Inv. |
| 25 | E(100 parts by weight) | G1(8) | — | D2(1.5) | — | A(0.2 parts by weight) | B | 1.05 | 1.3 | 80 | 1.5 | Inv. |
| 26 | E(100 parts by weight) | G1(10) | — | D2(1.5) | — | A(0.2 parts by weight) | B | 1.05 | 1.3 | 80 | 1.5 | Inv. |
| 27 | E(100 parts by weight) | G1(30) | — | D2(1.5) | — | A(0.2 parts by weight) | B | 1.05 | 1.3 | 80 | 1.5 | Inv. |
| 28 | E(100 parts by weight) | G1(35) | — | D2(1.5) | — | A(0.2 parts by weight) | B | 1.05 | 1.3 | 80 | 1.5 | Inv. |
| 29 | E(100 parts by weight) | G1(20) | — | A2(0.5) | B2(0.5) | A(0.2 parts by weight) | B | 1.05 | 1.3 | 80 | 1.5 | Inv. |
| 30 | E(100 parts by weight) | G1(20) | — | D2(1.5) | — | A(0.2 parts by weight) | B | 1.05 | 1.4 | 60 | 1.5 | Inv. |

Inv.: This invention
Comp.: Comparative example

The obtained cellulose ester film samples 1-30 were evaluated as described below.

Method of Evaluation (Haze)

3 sheets of the film sample were superimposed and then measured using the 2600DA manufactured by Tokyo Denshoku Industries in accordance with ASTM-D1003-52.

(Bleeding Out)

Bleeding out was evaluated after the film samples were stored for 1,000 hours in the high temperature and high humidity environment of 80° C. and 90% RH.

The presence or absence of bleeding out was evaluated by observing the surface of the film.

A: There was no bleeding out at the film surface.

B: Slight bleeding out at the film surface was partially observed to some extent.

C: Slight bleeding out at the entire surface of the film was absolutely observed to some extent D: Bleeding out at the entire surface of the film was clearly observed.

(Contact Angle)

The contact angle with water of the film that was subjected to alkali saponification treatment was measured at 23° C. and 55% RH.

| Alkali Saponification Treatment | | |
|---|---|---|
| Saponification process | 2N-NaOH | 50° C. 90 seconds |
| Water washing process | Water | 30° C. 45 seconds |
| Neutralizing process | 10 percent by weight HCl | 30° C. 45 seconds |
| Water washing process | Water | 30° C. 45 seconds |

The film was subjected to saponification, water washing, neutralization, and then water washing in that order, and then dried at 80° C. The treated material is subjected to humidity conditioning for 24 hours at a temperature of 23° C. and relative humidity of 55% and then measured using a CA-D type contact angle meter which was produced by Kyowa Kaimen Kagaku Co., Ltd.

(Ro, Rt, Rt: Humidity Changes)

Measurements for the retardation of the film that had been left for 24 hours at 23° C. and 55% RH using light with at a wavelength of 590 nm was don under the same conditions by means of an automatic birefringence meter KOBRA-21ADH (manufactured by Oji Measuring Instruments Co., Ltd.) to obtain Ro and Rt. That is to say, the average refraction index of the materials composing the film which was measured by the Abbe refractometer and the film thickness d are input and the values for the retardation in the plane of the film (Ro) and the retardation in the thickness direction (Rt) are obtained.

The values for the three-dimensional refractive index nx, ny and nz can also be calculated using this device.

In addition, the humidity change is obtained by measuring the Rt of the samples that have been subjected to humidity conditioning for not less than 12 hours under conditions of 23° C. and 20% RH and then subsequently measuring the Rt of the samples that have been subjected to humidity conditioning for not less than 12 hours under conditions of 23° C. and 80% RH in the same manner and then measuring the change.

The results of the above-described evaluation are shown in Table 3.

TABLE 3

| Cellulose ester film sample No. | Ro (nm) | Rt (nm) | Rt humidity changes (nm) | Haze (%) | Bleeding out | Contact angle (° C.) | Remarks |
|---|---|---|---|---|---|---|---|
| 1 | 43 | 115 | 9 | 2.2 | A | 24 | Inv. |
| 2 | 40 | 103 | 8 | 1.2 | A | 25 | Inv. |
| 3 | 41 | 125 | 8 | 2.4 | A | 25 | Inv. |
| 4 | 44 | 120 | 7 | 1.2 | A | 24 | Inv. |
| 5 | 42 | 113 | 8 | 2.1 | A | 25 | Inv. |
| 6 | 42 | 109 | 7 | 2.8 | A | 24 | Inv. |
| 7 | 50 | 130 | 5 | 0.8 | A | 23 | Inv. |
| 8 | 38 | 100 | 18 | 12.2 | A | 24 | Comp. |
| 9 | 39 | 105 | 15 | 13.1 | A | 25 | Comp. |
| 10 | 38 | 98 | 17 | 14.5 | A | 24 | Comp. |
| 11 | 43 | 130 | 30 | 1.8 | A | 25 | Comp. |
| 12 | 47 | 145 | 12 | 13.5 | D | 25 | Comp. |
| 13 | 28 | 90 | 11 | 2.8 | A | 25 | Comp. |
| 14 | 40 | 102 | 9 | 1.2 | A | 24 | Inv. |
| 15 | 43 | 105 | 8 | 1.1 | A | 24 | Inv. |
| 16 | 45 | 110 | 8 | 1.3 | A | 25 | Inv. |
| 17 | 49 | 115 | 9 | 1 | A | 24 | Inv. |
| 18 | 51 | 128 | 8 | 1.4 | A | 24 | Inv. |
| 19 | 55 | 130 | 9 | 1.3 | A | 30 | Inv. |
| 20 | 47 | 120 | 9 | 1.2 | A | 25 | Inv. |
| 21 | 53 | 138 | 9 | 1.4 | A | 31 | Inv. |
| 22 | 49 | 135 | 7 | 2.5 | C | 25 | Inv. |
| 23 | 48 | 133 | 8 | 2.1 | B | 24 | Inv. |
| 24 | 47 | 130 | 9 | 1.9 | B | 25 | Inv. |
| 25 | 43 | 135 | 12 | 0.8 | A | 25 | Inv. |
| 26 | 44 | 130 | 10 | 0.8 | A | 25 | Inv. |
| 27 | 44 | 115 | 5 | 1.5 | A | 24 | Inv. |
| 28 | 42 | 109 | 8 | 3.8 | A | 24 | Inv. |
| 29 | 47 | 130 | 7 | 1.8 | C | 24 | Inv. |
| 30 | 45 | 110 | 4 | 1.2 | A | 23 | Inv. |

Inv.: This invention
Comp.: Comparative example

From the above Table, it is proved that the Rt humidity changes of the samples of this invention are remarkably improved and have extremely stable properties. Further, it is proved that there are no problems with haze and bleeding out, and because the contact angle with water is low, function as a polarizing protection film is excellent.

What is claimed is:

1. A stretched cellulose ester film produced by stretching after film forming employing cellulose acetate propionate or cellulose triacetate including a polyester polyol obtained from (a) a glycol having an average carbon atom number of 2 to 3.5 and (b) a dibasic or an anhydrous dibasic acid having an average carbon number of 4 to 5.5,
wherein the stretched cellulose ester film exhibits retardation value Ro in the range of 30 to 200 nm, and a retardation value Rt in the range of 70 to 400 nm, Ro and Rt are each defined by Formulas (1) and (2); and the polyester polyol has a number average molecular weight of from 1,200 to 4,000:

$Ro=(nx-ny)\times d$, and      Formula (1)

$Rt=\{(nx+ny)/2-nz\}\times d$,      Formula (2)

wherein nx is a refractive index in an x direction which gives a maximum refractive index in a plane of the film, ny is a refractive index in a y direction which is orthogonal to the x direction in the plane of the film, nz is a refractive index in a thickness direction of the film, and d is a thickness (nm) of the film.

2. The stretched cellulose ester film of claim 1, wherein the total acyl substitution degree of the cellulose ester is between 2.4 and 2.8.

3. The stretched cellulose ester film of claim 1, wherein (a) the glycol is ethylene glycol or a mixture of ethylene glycol and diethylene glycol, and (b) the dibasic acid or anhydrous dibasic acid is succinic acid or a mixture of succinic acid and terephthalic acid.

4. The stretched cellulose ester film of claim 1, wherein the cellulose ester film comprises an additive having a number average molecular weight of 500 or less and a polyester polyol having a number average molecular weight of 1,000 or more, and the proportion of the weight of the additive to the weight of the polyester polyol is equal to 0.1 or less, wherein the additive is a plasticizer, an ultraviolet light absorber, a retardation regulator, a stabilizer or an antioxidant.

5. The stretched cellulose ester film of claim 1, containing 10 to 30 percent by weight of the polyester polyol.

6. The stretched cellulose ester film of claim 1, wherein the cellulose ester film contains an ultraviolet light absorbing copolymer synthesized from an ultraviolet light absorbing monomer represented by Formula (1):

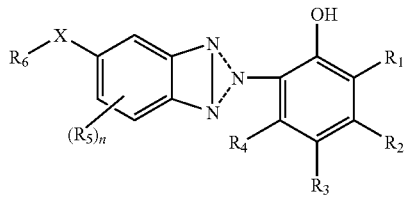

Formula (1)

wherein, n is an integer of 0 to 3, $R_1$ to $R_5$ are each a hydrogen atom, a halogen atom or a substituent group, X is —COO—, —CONR$_7$—, —OCO—, or NR$_7$CO, and $R_6$ is a hydrogen atom, an alkyl group, an alkenyl group, an alkinyl group or an aryl group, $R_7$ is a hydrogen atom, an alkyl group, or an aryl group, and the group represented by $R_6$ has a polymerizable group as a part of its structure, wherein the substituent group of $R_1$ to $R_5$ is an alkyl group, an alkenyl group, an aryl group, a heterocyclic group, an alkoxyl group, an aryloxy group, a heterocyclic oxy group, an acyloxy group, an acyl group, an alkoxycarbonyl group, an aryloxy carbonyl group, a carbamoyl group, an amino group, an alkyl amino group, an anilino group, an acyl amino group, a hydroxyl group, a cyano group, a nitro group, a sulfonamide group, a sulfamyl amino group, a sulfonyl group, a sulfamoyl group, a sulfonyl amino group, a ureido group, an imide group, a silyl group, an alkylthio group, or an arylthio group.

7. A polarizing plate comprising the stretched cellulose ester film of claim 1.

8. A liquid crystal display device comprising the stretched cellulose ester film of claim 1.

9. A liquid crystal display device comprising the polarizing plate described in claim 7.

* * * * *